United States Patent
Hiramatsu et al.

(10) Patent No.: US 6,594,052 B2
(45) Date of Patent: *Jul. 15, 2003

(54) TRANSMITTING APPARATUS AND METHOD, RECEIVING APPARATUS AND METHOD, DISTRIBUTION MEDIUM AND TRANSMITTING SYSTEM

(75) Inventors: Tamihei Hiramatsu, Kanagawa (JP); Toshio Okada, Tokyo (JP); Takashi Iwasa, Tokyo (JP); Yoshiyuki Sato, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,065

(22) Filed: Apr. 20, 1999

(65) Prior Publication Data

US 2003/0091348 A1 May 15, 2003

(30) Foreign Application Priority Data

Apr. 22, 1998 (JP) ............................................. 10-111683

(51) Int. Cl.$^7$ .......................... H04J 14/02; G06F 15/16; H04N 9/80
(52) U.S. Cl. ...................... 359/152; 359/125; 704/275; 886/27; 711/112; 709/226
(58) Field of Search ................. 359/152, 125; 704/275; 386/27; 711/112; 709/226; 395/500

(56) References Cited

U.S. PATENT DOCUMENTS

| | | | | | |
|---|---|---|---|---|---|
| 5,321,542 | A | * | 6/1994 | Freitas et al. ............... | 359/172 |
| 5,526,161 | A | * | 6/1996 | Suzuki et al. ............... | 359/172 |
| 5,564,020 | A | * | 10/1996 | Rossi .................... | 395/200.15 |
| 5,721,878 | A | * | 2/1998 | Ottesen et al. ................ | 725/87 |
| 5,751,883 | A | * | 5/1998 | Ottesen et al. .............. | 386/125 |
| 5,774,859 | A | * | 6/1998 | Houser et al. .............. | 704/275 |
| 6,025,942 | A | * | 2/2000 | Scifres ........................ | 359/125 |
| 6,044,256 | A | * | 3/2000 | Kobayashi ................... | 455/404 |
| 6,167,253 | A | * | 12/2000 | Farris et al. ................ | 455/412 |
| 6,230,200 | B1 | * | 5/2001 | Forecast et al. ............ | 709/219 |

* cited by examiner

Primary Examiner—Jason Chan
Assistant Examiner—David Payne
(74) Attorney, Agent, or Firm—Frommer Lawrence & Haug LLP; William S. Frommer; Darren S. Simon

(57) ABSTRACT

The OD servers, encoders, NOD servers and CPUs supply voice data, character data and remote control data together with the control information. A transmitter modulates the control information and voice data, etc. by the QPSK modulation method. An infrared ray emitter outputs the modulated infrared ray depending on the modulated signal. A receiving apparatus reproduces acoustic signal from the modulated infrared ray and displays characters and also transmits the signal corresponding to the remote control data to the transmitting apparatus with the infrared ray. An infrared ray detector receives the modulated infrared ray output from the receiving apparatus. Thereby, with this system, the signal, required by the receiving side or suitable for the condition of the receiving side, supplied through many channels can be transmitted without any restriction on the wiring.

13 Claims, 17 Drawing Sheets

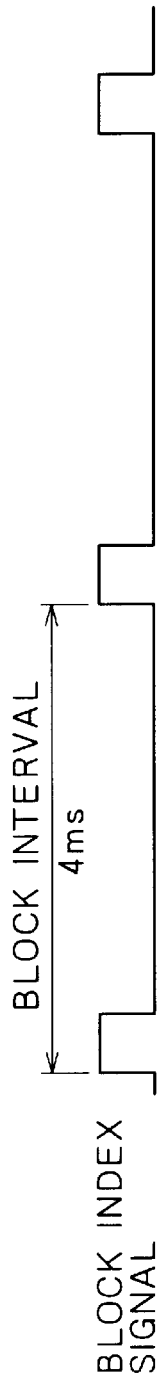
F I G. 2
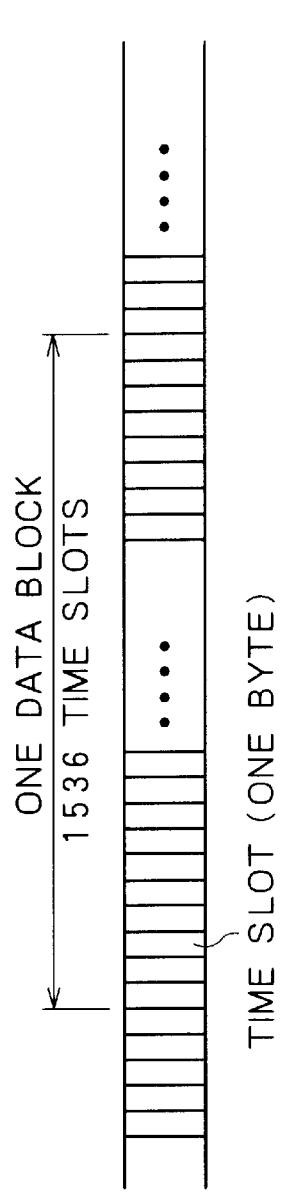
F I G. 3
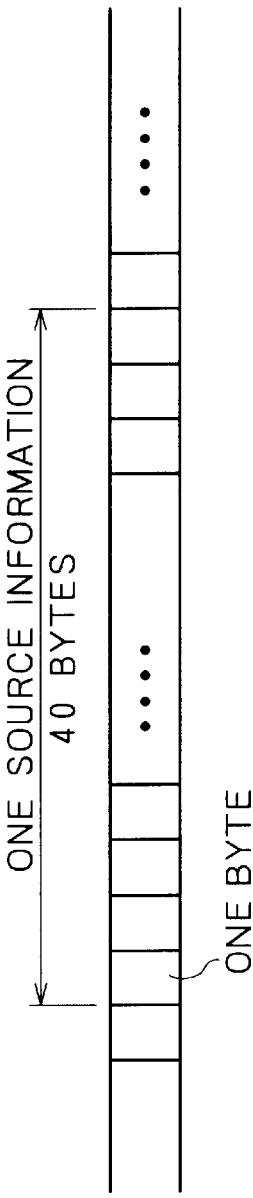
F I G. 4

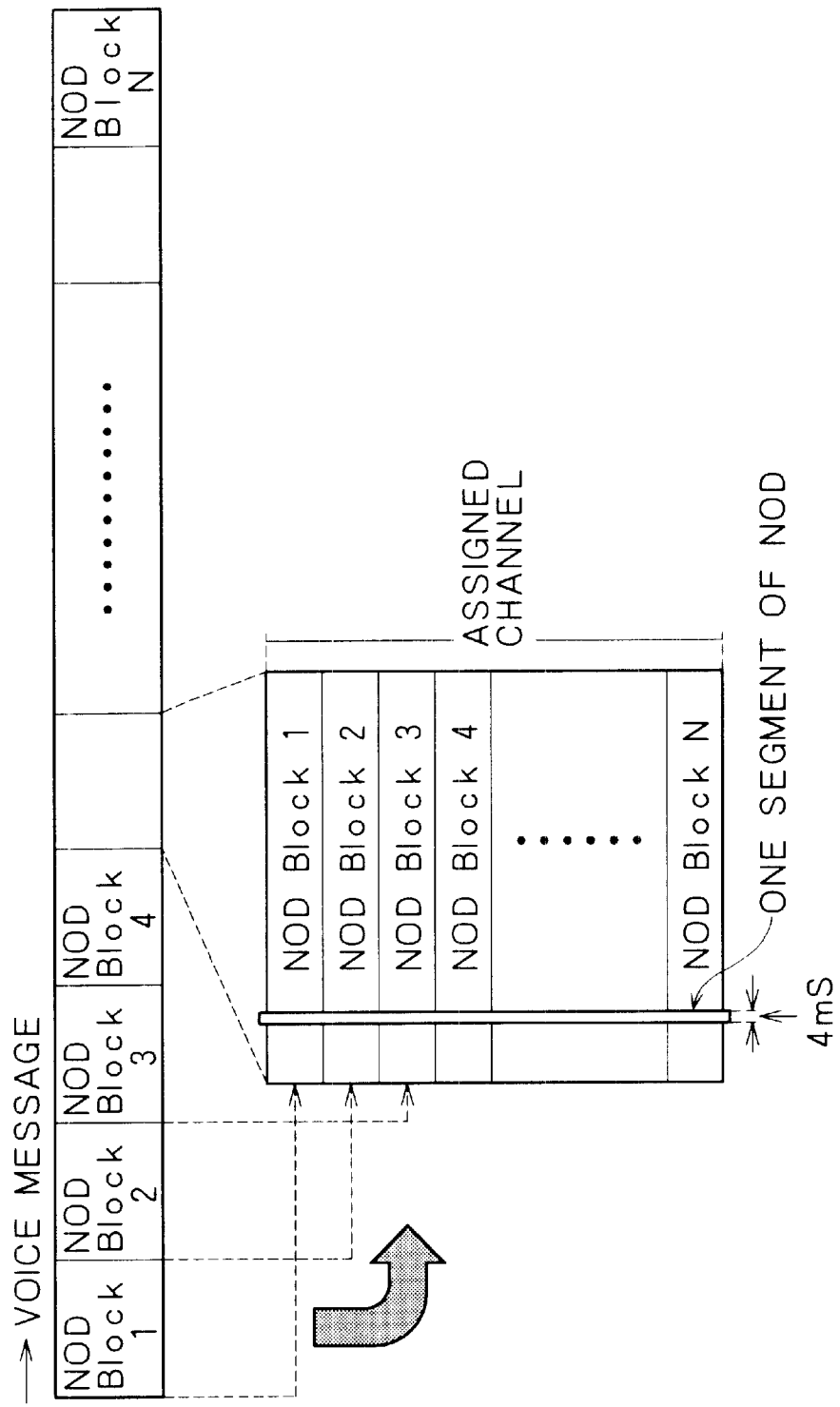

FIG. 7

VOICE CHANNEL (CATEGORY FLAG = 00)

| BYTE ↓ | Bit 0 | Bit 1 | Bit 2 | Bit 3 | Bit 4 | Bit 5 | Bit 6 | Bit 7 |
|---|---|---|---|---|---|---|---|---|
| 0 | CATEGORY FLAG | | NUMBER OF OCCUPIED TIME SLOTS (PER CHANNEL) | | | | | |
| 1 | ENCODING SYSTEM | | | | | NUMBER OF AUDIO CHANNELS (UPPER BITS) | | |
| 2 | NUMBER OF VOICE CHANNELS (LOWER BITS) | | | | | | | |

FIG. 8

NOD VOICE (CATEGORY FLAG = 01)

| BYTE ↓ | Bit 0 | Bit 1 | Bit 2 | Bit 3 | Bit 4 | Bit 5 | Bit 6 | Bit 7 |
|---|---|---|---|---|---|---|---|---|
| 0 | CATEGORY FLAG | | NUMBER OF OCCUPIED TIME SLOTS (PER NOD CHANNEL) | | | | | |
| 1 | ENCODING SYSTEM | | | | | NUMBER OF NOD CHANNELS (UPPER BITS) | | |
| 2 | NUMBER OF NOD CHANNELS (LOWER BITS) | | | | | | | |

FIG. 9

CHARACTER DATA (CATEGORY FLAG = 10)

| BYTE ↓ | Bit 0 | Bit 1 | Bit 2 | Bit 3 | Bit 4 | Bit 5 | Bit 6 | Bit 7 |
|---|---|---|---|---|---|---|---|---|
| 0 | CATEGORY FLAG | | NUMBER OF OCCPIED TIME SLOTS | | | | | |

FIG. 10

REMOTE CONTROL DATA (CATEGORY FLAG = 11)

| BYTE ↓ | Bit 0 | Bit 1 | Bit 2 | Bit 3 | Bit 4 | Bit 5 | Bit 6 | Bit 7 |
|---|---|---|---|---|---|---|---|---|
| 0 | CATEGORY FLAG | | NUMBER OF OCCUPIED TIME SLOTS | | | | | |

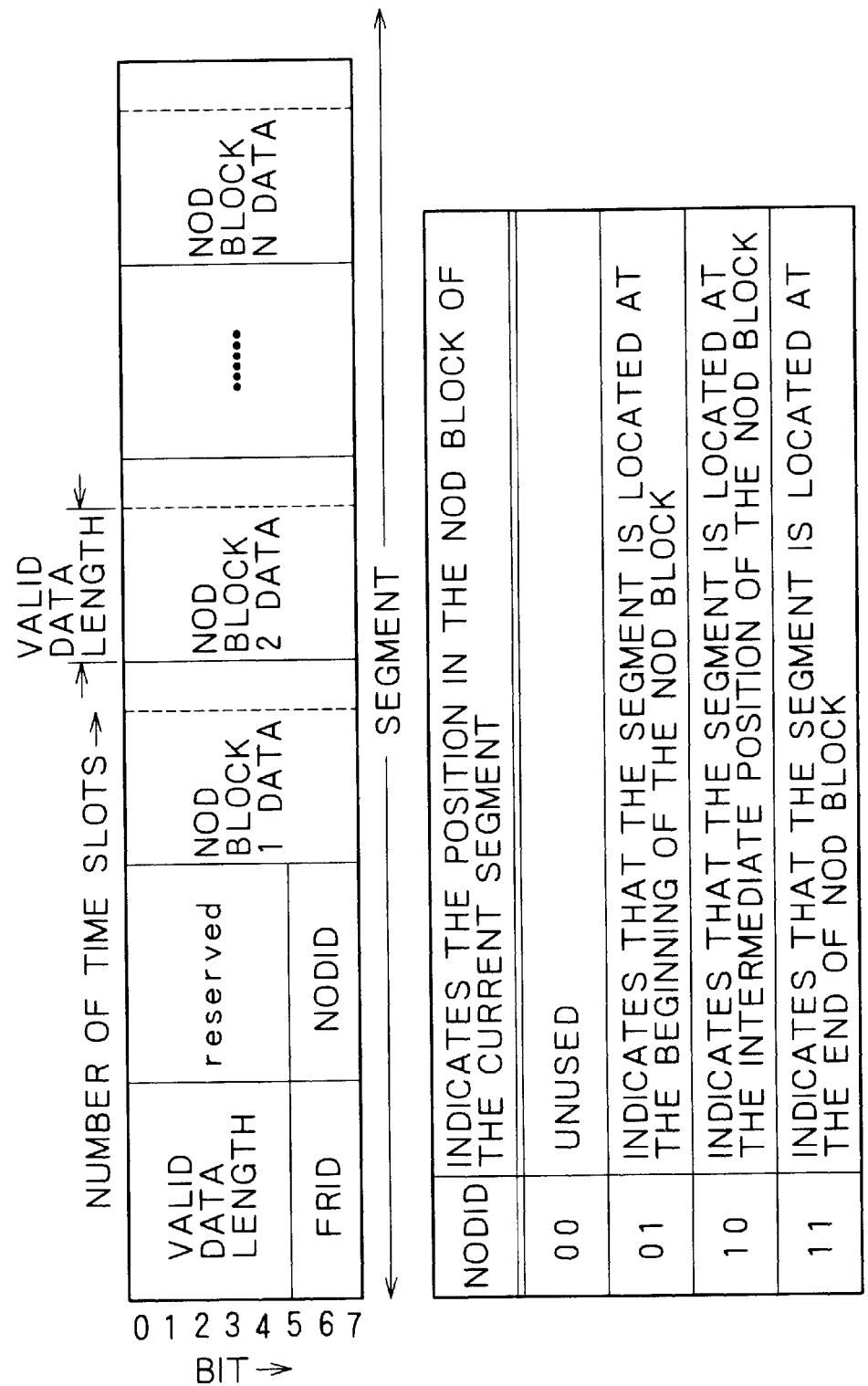

FIG.13

→ BIT

| 0 | 1 | 2 | 3 | 4 | 5 | 6 | 7 |
|---|---|---|---|---|---|---|---|
| VLD | RT | PS | CSY | Data 0 | Data 1 | Data 2 | Data 3 |

| VLD | 0 : CHARACTER DATA IS INVALID<br>1 : CHARACTER DATA IS VALID<br>    BEGINNING OF THE CHARACTER DATA DURING<br>    THE ACCUMULATION MODE |
|---|---|
| RT | 0 : CHARACTER DATA IS IN THE ACCUMULATION MODE<br>1 : CHARACTER DATA IS IN THE REALTIME DISPLAY<br>    MODE |
| P/S | 0 : CHARACTER DATA IS TRANSMITTED BY THE<br>    NIBBLE TRANSMISSION IN UNIT OF 4 BITS<br>1 : CHARACTER DATA IS TRANSMITTED BY THE ONE<br>    BIT SERIAL TRANSMISSION OF FOUR SYSTEMS |
| CSY | 1 : SYNCHRONOUS SIGNAL FOR CHARACTER DATA |
| Data 0<br>?<br>Data 3 | CHARACTER DATA |

FIG.14

→ BIT

| 0 | 1 | 2 | 3 | 4 | 5 | 6 | 7 |
|---|---|---|---|---|---|---|---|
| \multicolumn{8}{c}{DST NUMBER (10 BITS)} |
|   |   | OP CODE (6 BITS) | | | | | |

| DST | OBJECT OF REMOTE CONTROL OPERATION |
|---|---|
| OP | KINDS OF OPERATION |

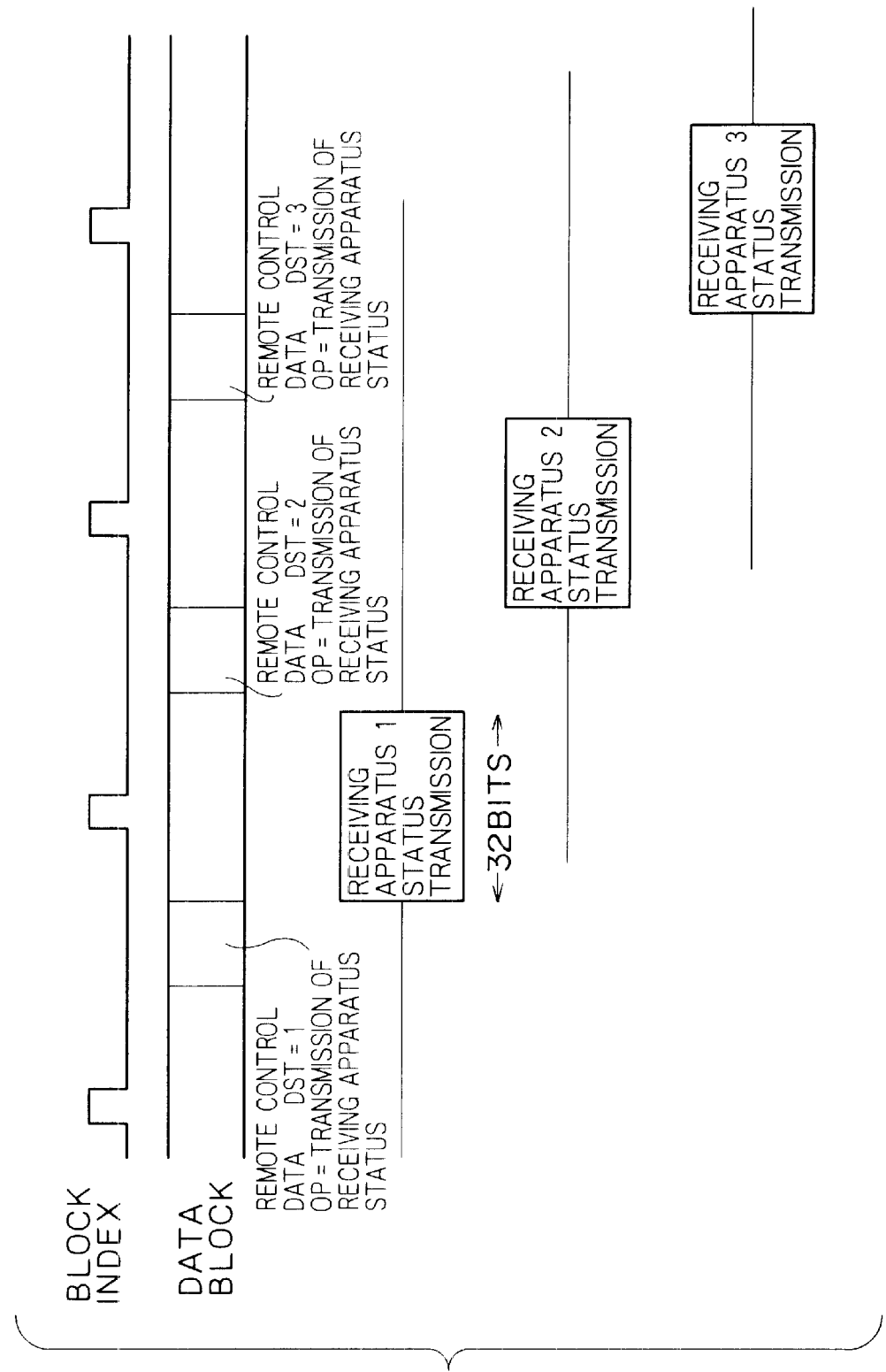

TRANSMITTING APPARATUS AND METHOD, RECEIVING APPARATUS AND METHOD, DISTRIBUTION MEDIUM AND TRANSMITTING SYSTEM

BACKGROUND OF THE INVENTION

1. Field of the Invention

The present invention relates to a transmitting apparatus, transmitting method, receiving apparatus, receiving method, distribution medium and transmitting system and particularly to a transmitting apparatus, transmitting method, receiving apparatus, receiving method, distribution medium and transmitting system for transmitting, with infrared ray, the signals supplied in channels required from the receiving side or suitable for the receiving side.

2. Description of the Related Art

On the occasion of transmitting a signal for displaying voice signal and related characters transmitted, for example, from a conventional conference system, language learning (LL) system or guidance system, for example, to an acoustic device such as earphone and head phone or display device, it is generally required to connect these devices with a physical transmission line such as a cable. However, for the conference system to be used for the conference in which many attendants take part, wirings as many as the number of attendants are required. Moreover, even in the case of the LL system used by many users, a large amount of wirings are required and moreover exclusive conference rooms and learning rooms are required and when the conference system or LL system is once installed, it cannot be moved easily.

Moreover, in the case of the guidance system for repeatedly reproducing one voice source in the endless mode via a headphone, etc., action of the relevant user is restricted by the winding. Moreover, in such guidance system which requires wirings also requires the space wider than the predetermined space at the system installation area. Simultaneously, here lies such various restrictions that number of users for simultaneous use is restricted by the length of wiring and large influence is applied to the external appearance. On the other hand, in the case of the guidance system utilizing a PA (Public Address) apparatus using a speaker, the number of channels of voice information reproduced is restricted by interference of audio sound produced from the speaker and if a channel can be selected, such a physical restriction that the distance longer than the predetermined one is requires has to generally considered. Therefore, a user cannot always hear the explanation from the beginning or from the desired part anytime he wants. If he has heard from the intermediate part of explanation, the time to return to the beginning after explanation is once completed is required.

Here, the wiring for sending, to the signal supplying side, the selecting signal to select the channel for transmitting the information which a user desires is also required in addition to the wiring to send the signal to the acoustic device or display device in the user side.

As explained above, the conference system, language learning system or guidance system of the related art have the problems that these system require the wirings as much as the number of users and the system itself becomes expensive and also requires much labors for installation and alteration and moreover actions of users are restricted.

SUMMARY OF THE INVENTION

The present invention has been proposed considering such background and it is therefore an object of the present invention to transmit the signals supplied in a plurality of channels required by the receiving side or suitable for the receiving side without any restriction of wiring.

According to the present invention, the transmitting apparatus is characterized in comprising a supplying means for supplying signal, an outputting means for outputting infrared ray based on the signal supplied from the supplying means and a light receiving means for receiving the infrared ray output from the receiving apparatus.

The transmitting method of the present invention is characterized in comprising a supplying step for supplying signal, an outputting step for outputting the infrared ray based on the signal supplied by the supplying step, a light receiving step for receiving the infrared ray output from the receiving apparatus and a demodulating step for demodulating the signal output from the light receiving step.

A distribution medium of the present invention is characterized by having recorded a computer-readable program for executing the processes including the supplying step for supplying signal, the outputting step for outputting the infrared ray based on the signal supplied by the supplying step, the light receiving step for receiving infrared ray output by the receiving apparatus and the demodulating step for demodulating the signal output by the light receiving step.

The receiving apparatus of the present invention is characterized in comprising the light receiving means for receiving the infrared ray, the demodulating means for demodulating a signal output from the light receiving means, a selecting means for selecting a signal output from the demodulating means and an infrared ray outputting means for outputting a signal with the infrared ray to the transmitting apparatus.

The receiving method of the present invention is characterized in comprising the light receiving step for receiving the infrared ray, the demodulating step for demodulating a signal output from the light receiving step, a selecting step for selecting a signal output from the demodulating step and an infrared ray outputting step for outputting a signal with the infrared ray to the transmitting apparatus responding to the signal output from the demodulating step.

The distribution medium of the present invention is characterized in recording a computer-readable program for executing the processes including the light receiving step for receiving the infrared ray, the demodulating step for demodulating a signal output from the light receiving step, the selecting step for selecting a signal output from the demodulating step and the infrared ray outputting step for outputting a signal with the infrared ray to the transmitting apparatus responding to a signal output from the demodulating step.

The transmitting system of the present invention is characterized in that the transmitting apparatus comprises a supplying means for supplying signals of a plurality of channels, a first output means for outputting the infrared ray based on a signal supplied from the supplying means and a first light receiving means for receiving the infrared ray output from the receiving apparatus and the receiving apparatus in turn comprises a second light receiving means for receiving the infrared ray output from the first output means, a demodulating means for demodulating a signal output from the second light receiving means, a selecting means for selecting a signal output from the demodulating means and a second output means for outputting the infrared ray signal to the transmitting apparatus responding to a signal output from the demodulating means.

In the transmitting apparatus, transmitting method, receiving apparatus, receiving method, distribution medium and transmitting system of the present invention, the transmitting side outputs the signal supplied with the infrared ray and receives the infrared ray output from the receiving side. The receiving side outputs a signal with the infrared ray to the transmitting side responding to the signal included in the infrared ray received.

BRIEF DESCRIPTION OF THE DRAWINGS

FIG. 2 is a diagram showing a waveform of block index signal.

FIG. 3 is a diagram showing a format of data block.

FIG. 4 is a diagram showing a format of source information.

FIG. 6 is a diagram showing a format of NOD voice message.

FIG. 7 is a diagram showing a format of the part for the voice channel data in the source information.

FIG. 8 is a diagram showing a format of the part for NOD voice data in the source information.

FIG. 9 is a diagram showing a format of the part for character data in the source information.

FIG. 10 is a diagram showing a format of the part for remote control data in the source information.

FIG. 12 is a diagram showing a format of one segment of the NOD voice data.

FIG. 13 is a diagram showing a format of character data of data block.

FIG. 14 is a diagram showing a format of remote control data in the data block.

FIG. 25 is a time chart of the signal in such a case that one receiving apparatus 2 is designated for data block and the operation code to transmit the status of receiving apparatus is transmitted.

DETAILED DESCRIPTION OF THE INVENTION

Figure 1:
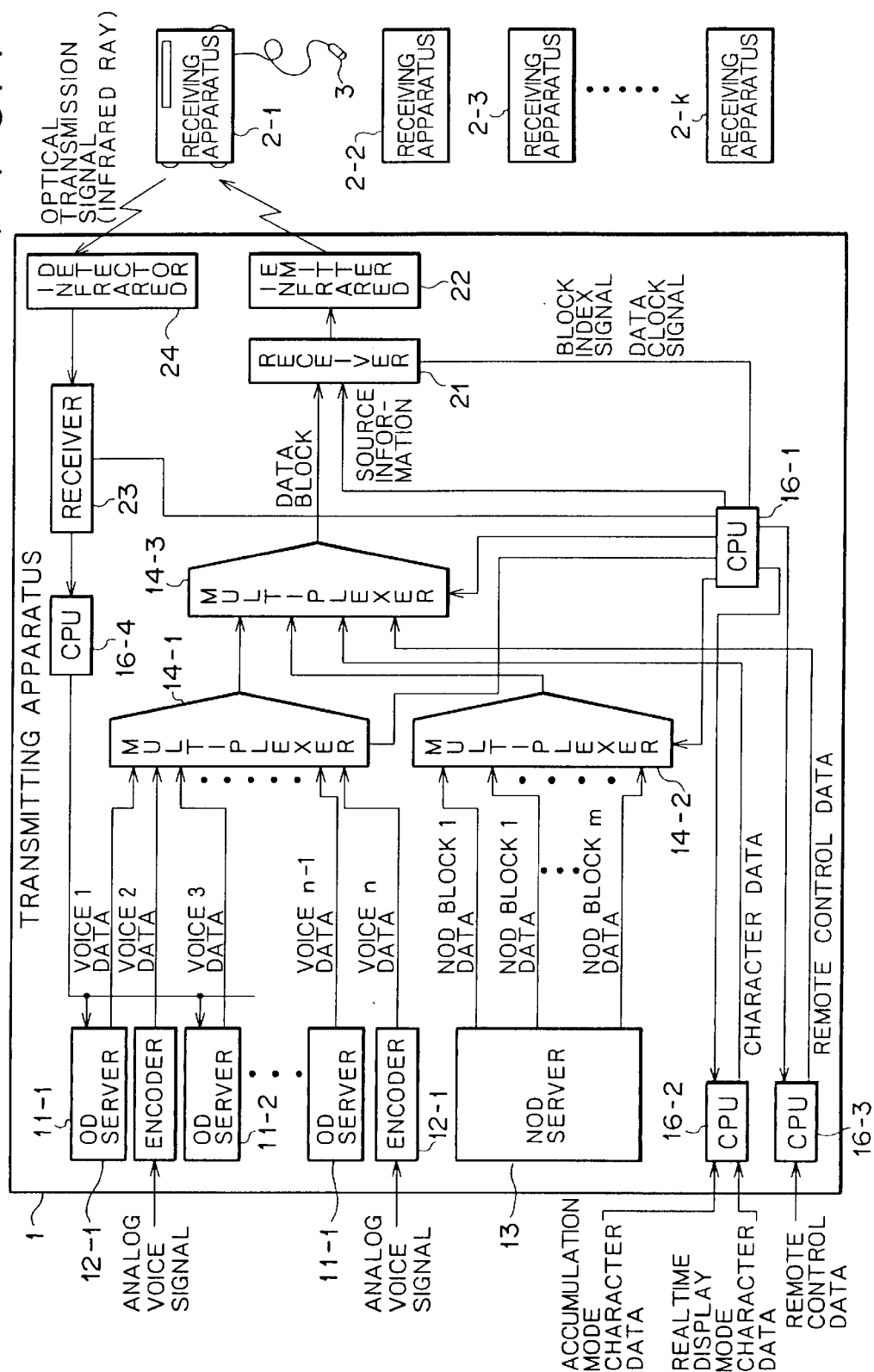
FIG. 1 is a block diagram showing an example of structure of a preferred embodiment of the transmitting apparatus of the present invention.

The preferred embodiments of the present invention will be explained to make clear the characteristics of the present invention by adding the corresponding embodiment (only an example) within the parentheses after each means in view of explaining the correspondence between the means explained in the claims and embodiments. However, the description is not restricted to description of each means.

Namely, the transmitting apparatus of the present invention is characterized in comprising a supplying means for supplying signals (for example, OD server 11-1 to 11-i of FIG. 1), an outputting means (for example, infrared ray emitter 22 of FIG. 1) for outputting the infrared ray based on the signal supplied from the supplying means and a light receiving means (for example, infrared ray detector 24 of FIG. 1) for receiving the infrared ray output from the receiving apparatus.

The receiving apparatus of the present invention is characterized in comprising a light receiving means (for example, infrared ray detector 51 of FIG. 18) for receiving the infrared ray, a demodulating means (for example, receiver 52 of FIG. 18) for demodulating the signal output from the light receiving means, a selecting means (for example, gate 54 of FIG. 18) for selecting the signal output from the demodulating means and an infrared ray outputting means (for example, infrared ray emitter 61 of FIG. 18) for outputting the signal with the infrared ray to the transmitting apparatus corresponding to the signal output from the demodulating means.

The transmitting system of the present invention is characterized in that the transmitting apparatus is comprising a supplying means (for example, OD servers 11-1 to 11-i of FIG. 1) for supplying the signals of a plurality of channels, a first output means (for example, infrared ray emitter 22 of FIG. 1) for outputting the infrared ray and a first light receiving means (for example, infrared ray detector 24 of FIG. 1) for receiving the infrared ray output from the receiving apparatus and the receiving apparatus is comprising a second light receiving means (for example, infrared ray detector 51 of FIG. 18) for receiving the infrared ray output from the first output means, a demodulating means (for example, receiver 52 of FIG. 18) for demodulating the signal output from the second light receiving means, a selecting means (for example, gate 54 of FIG. 18) for selecting the signal output from the demodulating means and a second output means (for example, infrared ray emitter 61 of FIG. 18) for outputting the infrared ray signal to the transmitting apparatus corresponding to the signal output from the demodulating means.

The voice signals of a plurality of channels and related character signals from the transmitting apparatus of the present invention are sent to one or a plurality of receiving apparatuses with the optical transmitting signal utilizing the infrared ray and the signals for selecting the voice channel and for indicating the condition of the receiving apparatus itself from each receiving apparatus are also sent to the transmitting apparatus with the optical transmitting signal utilizing the infrared ray. FIG. 1 is a block diagram illustrating a structure of a preferred embodiment of the transmitting apparatus of the present invention. The OD (On-Demand) servers 11-1 to 11-i accumulate voice data and supplies such accumulated voice data to a multiplexer 14-1 together with the predetermined control information showing the format, etc. of the voice data. The encoders 12-1 to 12-j input an analog voice signal from external circuits, converts the analog signal to the digital data of the predetermined format and supplies the predetermined control information and converted voice data to the multiplexer 14-1. The NOD (Near-On-Demand) server 13 accumulates voice data and supplies the NOD data consisting of control information and voice data to the multiplexer 14-2 from the m output systems.

The multiplexer 14-1 inputs a plurality of data series from the OD servers 11-1 to 11-i and encoders 12-1 to 12-j and selects and outputs one data series with the signal from the CPU (Central Processing Unit) 16-1. An output of the multiplexer 14-1 is supplied to the multiplexer 14-3. The multiplexer 14-2 selects and outputs, from the input of a plurality of data series from the NOD server 13, one data series with the signal from the CPU 16-1. An output of the multiplexer 14-2 is supplied to the multiplexer 14-3.

The CPU16-2 inputs the accumulated mode character data and realtime display mode character data from an external circuit and supplies the character data to the multiplexer 14-3. Here, the accumulated mode character data is the character data which is once accumulated completely within the receiving apparatuses 2-1 to 20k (hereinafter, described only as receiving apparatus when it is not required to individually discriminate the receiving apparatuses 2-1 to 2-k) and is displayed at a time. On the other hand, the realtime display mode character data is character data which is sequentially transmitted continuously on the realtime basis like superimposed dialogs of movie and is then displayed sequentially. The signal requesting output of character data from the CPU16-1 and the signal indicating the transmission timing are supplied to the CPU16-2. The CPU16-3 inputs a remote control data from an external circuit and supplies the remote control data to the multiplexer 14-3. The signal requesting the remote control data from the CPU16-1 and the signal indicating the transmission timing are supplied to the CPU16-3.

A data block output from the multiplexer 14-3 is supplied to a transmitter 21. The source information output from the CPU16-1 is supplied to the transmitter 21. The block index signal and data clock signal for controlling the timing of the signal output of the multiplexers 14-1 to 14-3, CPU16-2 and CPU16-3 are supplied as the outputs to the CPU16-1 from the transmitter 21.

The modulated signal output from the transmitter 21 is supplied to the infrared ray emitter 22. Namely, the predetermined sub-carrier is modulated, for example, by the QPSK (Quadrature Phase Shift Keying) modulation and the phase shifting modulation (digital phase modulation) combining the TCM (Trellis Coded Modulation) modulation and 8PSK (Eight Phase Shift Keying) modulation and the modulated signal as the RF (Radio Frequency) signal obtained by this modulation is then output to the infrared ray emitter 22.

The infrared ray emitter 22 is an infrared ray generator consisting, for example, of a light emitting diode (or laser diode), a lens and an optical filter, etc. This infrared ray emitter 22 emits the infrared ray based on a modulated signal from the transmitter 21 and thereby outputs the modulated infrared ray in which the infrared ray as the main carrier is modulated. This modulated infrared ray is propagated through the space and is then received by the receiving apparatus 2. Here, according to CP-1205 and IEC-1603 of EIAJ, the frequency band of 2 MHz to 6 MHz is assigned for transmission of voice signal (acoustic signal) with the infrared ray. Among this frequency band, the band from 2 MHz to 3 MHz is mainly used in current for transmission of analog acoustic signal. Therefore, in this embodiment, the signal from the transmitting apparatus 1 is transmitted in the transmitting band consisting of the frequency band, for example, from 3 MHz to 6 MHz.

The infrared ray detector 24 is caused to receive the modulated infrared ray output from the receiving apparatus 2 and is then propagated through the space. The infrared ray detector 24 is an infrared ray receiving device consisting, for example, of an optical filter, a lens and a photodiode (or phototransistor) and outputs the signal (receiving signal) corresponding to the received infrared ray. In this case, therefore, the infrared ray detector 24 outputs the signal corresponding to the modulated infrared ray, namely the RF signal corresponding to the modulated signal output from the receiving apparatus 2. Here, the receiving apparatus 2 modulates the output signal by the ASK (Amplitude Shift Keying) modulation method using the frequency 455 KHz as the sub-carrier and outputs the signal as the modulated infrared ray in which the infrared ray as the main carrier is modulated.

The receiver 23 is caused to receive the modulated signal output from the infrared ray detector 4. The receiver 23 demodulates the modulated signal supplied to supply to the CPU16-1 and CPU16-4. Here, the modulated infrared ray output from the transmitting apparatus 1 and that output from the receiving apparatus 2 are different in the frequency of sub-carrier and modulation system and therefore the signal is never generated erroneously due to the interference between the infrared rays.

The signal output controlling the OD server of CPU16-4 is supplied to the OD servers 11-1 to 11-i.

FIG. 2 shows an example of the block index signal waveform output from the transmitter 21. The data block including the data from each server and encoder and the source information indicating the data block format are synchronized with the block index signal and is then input to the transmitter 21 in every 4 ms and is then transmitted to the receiving apparatus 2.

FIG. 3 shows an example of the data block format supplied to the transmitter 21 from the multiplexer 14-3. One data block is composed of 1536 time slots and each time slot is provided with one byte data inserted. One data block is read by the transmitter 21 in every time slot synchronized with the data block signal supplied from the transmitter 21 during the block index signal.

FIG. 4 shows an example of the source information format supplied to the transmitter 21 from the CPU16-1. One source information is composed of 40 bytes. One source information is read by the transmitter 21 in every byte in synchronization with the data clock signal supplied from the transmitter 21 during the block index signal.

Figure 5:
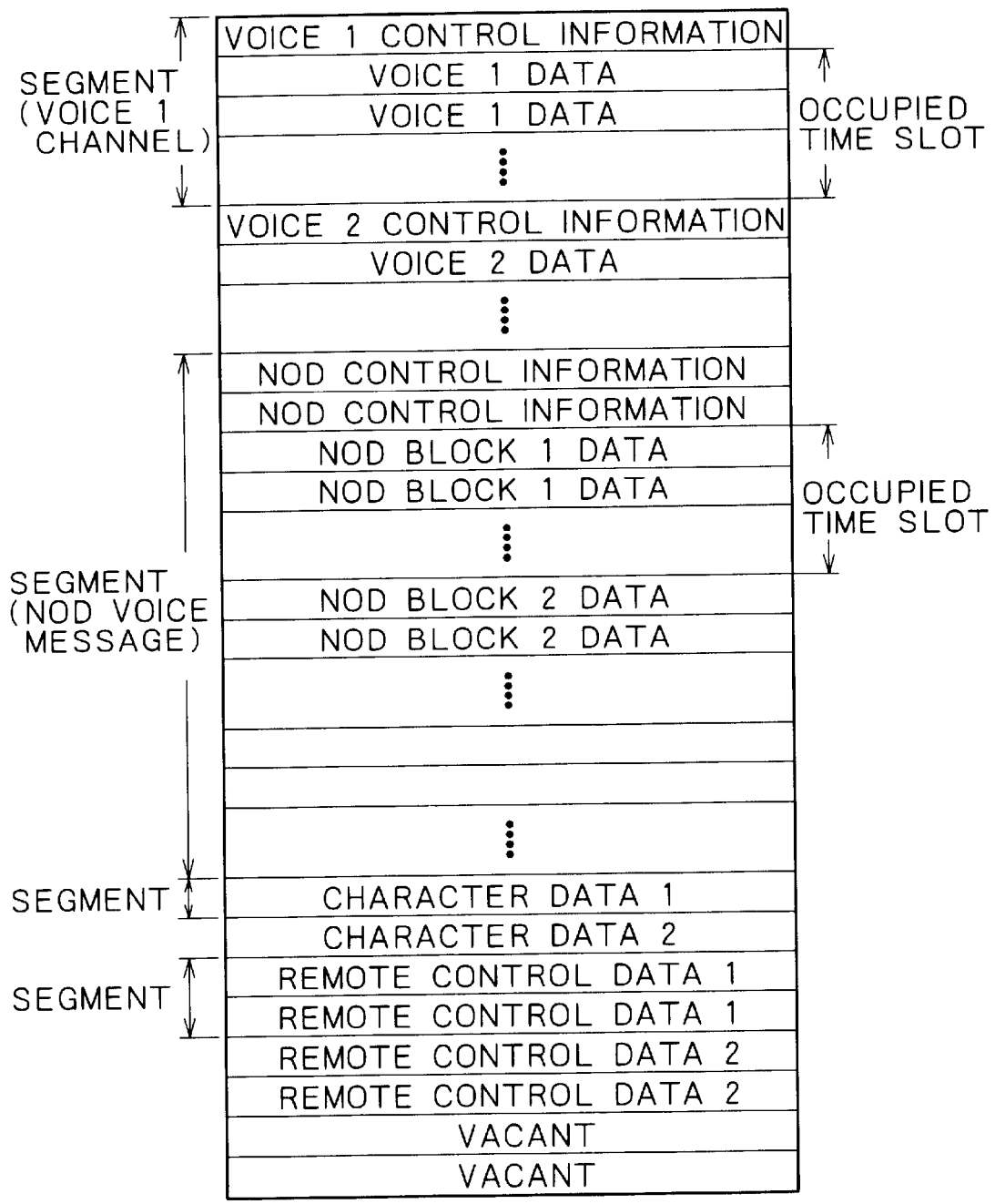
FIG. 5 is a diagram showing a format in the data block.

FIG. 5 schematically shows a format of data arrangement in the data block. Each time slot is assigned to satisfy the bit rate required for transmitted voice signal of each channel and for character display. Namely, the number of time slots required for each channel is assigned. Number of occupied slots for each channel is stored in the source information together with the other information. Data of each channel is arranged in the slot with addition of control information of one to two bytes at the beginning thereof. The transmission unit in the block combining the control information and data is called a segment.

In the example shown in FIG. 5, segment of one voice channel, segment of two voice channels, . . . , segment of NOD voice, . . . , character data 1, character data 2, remote control data 1, remote control data 2 are arranged in this sequence in the block. When the data transmitted by one block requires only 1536 time slots or less, there exists vacant slots where data is not inserted at the rear part of the block. As explained, the voice data or character display data of each channel are transmitted in every 4 ms in unit of number of occupied time slots.

FIG. 6 shows a format of the NOD voice message. The NOD voice message output from the NOD server 13 is divided into N NOD blocks which are defined, from its beginning, as NOD block 1, NOD block 2, . . . , NOD block N. In regard to the channels for output as voice, voice of the NOD block 1 is assigned to the channel 1, voice of the NOD block 2 to the channel 2, voice of the NOD block 3 to the channel 3 and subsequently voices of the NOD blocks are assigned up to the channel N in the same manner. One segment of the NOD voice data supplies the voice data during the total time of 4 ms from the NOD blocks 1 to N having passed only the predetermined time and the time common to each NOD block from the beginning of each NOD block.

FIG. 7 shows a format of the part corresponding to the voice channel data inserted at the beginning of the data block of FIG. 5. Continuous two bits in the LSB (Least Significant Bit) side of the first byte of the source information form a category flag indicating the category of transmitting data. When the category flag is 00, the source information is the voice channel information consisting of three bytes. The other six bits of the first byte indicate the number of occupied time slots per channel of multi-channel voice signal. Since the number of times of transmission of the data block is 250 times per second, data transfer at the rate of 2 Kbps per slot (8 bits) is possible. Number of occupied time slots having the width of six bits can designate the time slots from 1 to 64. Therefore, the transmitting apparatus 1 can transmit the voice data from 2 to 128 Kbps.

Continuous five bits in the LSB side of the second byte indicate the encoding system and are selected from the 32 kinds of the encoding system. Since the number of voice channels is indicated by 11 bits, maximum of 2048 channels can be designated but when the control information is considered, maximum of 758 voice channels can substantially be transmitted because the number of time slots is 1536.

FIG. 8 shows a format of the part corresponding to the NOD voice data in the source information. Continuous two bits in the LST side of the first byte form a category flag. When this category flag is 01, it indicates that the source information is the NOD voice information consisting of three bytes. The other six bits of the first byte indicate the number of occupied time slots per NOD block of the NOD voice. Continuous five bits in the LSB side of the second byte indicate the encoding system selected from 32 kinds of encoding systems. The remaining three bits of the second byte and the third byte indicate the number of NOD blocks. The maximum NOD blocks can be designated up to 2048 blocks but since the number of time slots is 1536, maximum of 1534 NOD blocks can substantially be transmitted when the control information is considered.

FIG. 9 shows a format of source information regarding the character data. Continuous two bits in the LSB side of the first byte indicate the category flag. When this category flat is 10, it indicates that the source information is the character data information consisting of one byte. The other six bits indicate the number of occupied time slots of the character data.

FIG. 10 shows a format of the source information of the part corresponding to the remote control data. Continuous two bits in the LSB side of the first byte indicate a category flag. When this category flag is 11, it indicates that the source information is the remote control data information consisting of one byte. The other six bits indicate the number of occupied time slots of the remote control data.

Figure 11:
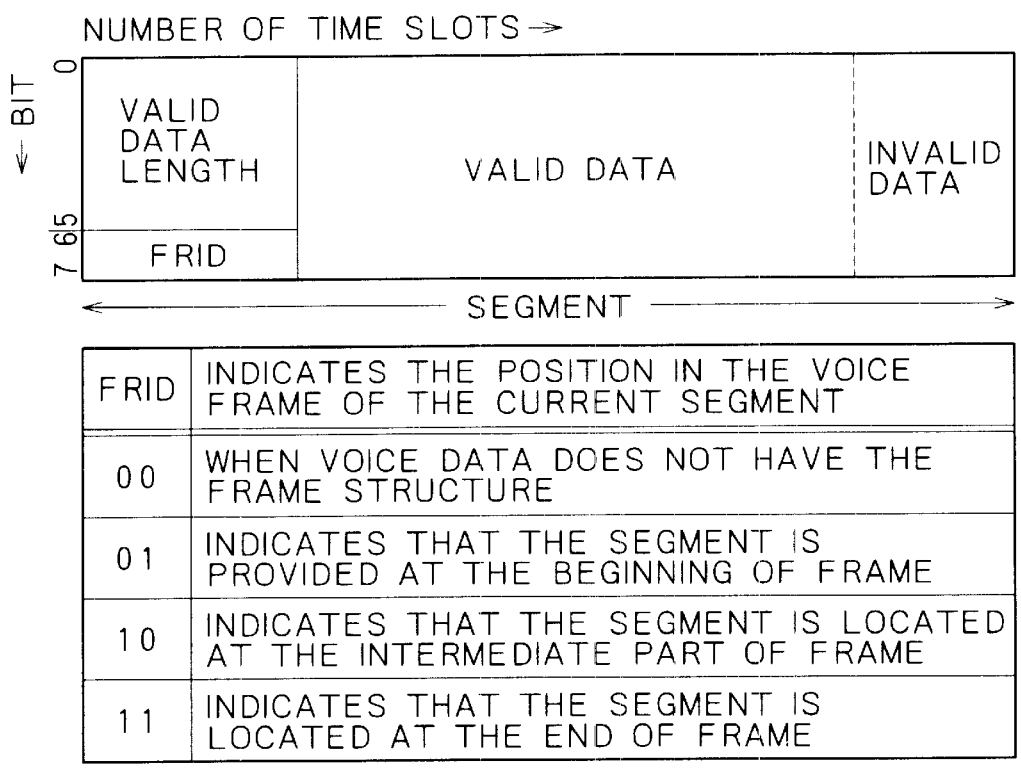
FIG. 11 is a diagram showing a format of one segment of the voice channel.

FIG. 11 shows a format of one segment of voice channel. The control information is inserted to the starting time slot, FRID (Frame ID) is arranged in the continuous two bits in the MSB (Most Significant Bit) side and the valid data length is arranged in the other six bits. FRID indicates, when it is 00, the voice data to be transmitted does not have the frame format. When FRID has a value other than 00, it indicates that the voice data is formed to have the frame format. When the voice data is formed to have the frame format, a frame unit must be recognized to decode the voice with a receiver. FRID indicates, when it is 01, the segment is located at the beginning of frame, the segment is located at the intermediate part of frame when it is 10 and the segment is located at the end of frame when it is 11.

When the transfer rate of the voice data is not integer times of 2 Kbps, the number of time slots does not take integer. Valid data length has information to adjust the number of time slots. Therefore, the number of valid time slots in the segment can be varied depending on this value in unit of block.

FIG. 12 shows a format within one segment of the NOD voice data. One segment of NOD voice data is composed of control information occupying two time slots, NOD CH1 data to NOD CH N data forming respective voices of the NOD channels from 1 to N. The first byte of the control information is composed of the FRID and valid data length. FRID is same as that of the voice channel and therefore the same explanation is never repeated here. The valid data length is same as that of voice channel and is used in common to the NOD CH 1 to NOD CH N.

In the continuous two bits in the MSB side of the second byte of the control information, NODID (NOD Block ID) is arranged and the other six bits are not used. NODID indicates, when it is 01, that the segment is located at the beginning of NOD block, it is located at the intermediate part of the NOD block when it is 10 and it is located at the end of the NOD block when it is 11. NODID does not use 00. The NOD block 1 data to N data from the next time slot of the control information are inserted to each time slot in the sequence of the block number in such a manner as NOD block 1 data, NOD block 2 data, NOD block 3 data, . . . , NOD block N data.

FIG. 13 shows a format of character data in the data block. VLD (valid/invalid) information is stored in the LSB. When 16 bits are assigned to one character, one character is transmitted by four data block and therefore the receiver 2 can displays 62 characters during one second. In the case of transferring the realtime display character data, since characters are replaced from time to time, display rate of 62 characters during one second is too fast and a user cannot identify the displayed characters. Therefore, VLD is used for adjustment of transfer rate of character data under the definition that when VLD is 0, character data is defined as invalid and when VLD is 1, character data is defined as valid. Moreover, in the case of transferring the accumulated mode character data, when VLD is 1, it indicates the beginning of character data.

The second bit RT (Real Time) from the lowest bit indicates that character data is in the accumulation mode when it is 0 and it is in the realtime display mode when it is 1. The third bit P/S (Parallel/Serial) from the lowest bit indicates that character data is transmitted in the nibble unit when it is 0 and character data is transmitted by the one bit serial transmission of four systems when it is 1. The fourth bit CSY (Character Sync) from the lowest bit is the synchronous signal for character data. The fifth bit to eighth bit from the lowest bit indicate are provided for insertion of the character data.

FIG. 14 shows a format of remote control data in the data block. The remote control data is formed of two bytes. The first byte and lowe two bits of the next byte in total of 10 bits indicate DST (Destination) number. The DST number identifies the receiving apparatus 2 as the remote control object. Upper six bits of the second byte form the OP (Operation Code) indicating the kind of operation for the receiving apparatus 2, for example, the operation causing the receiving apparatus 2 to generate the signal indicating the condition thereof.

Figure 15:
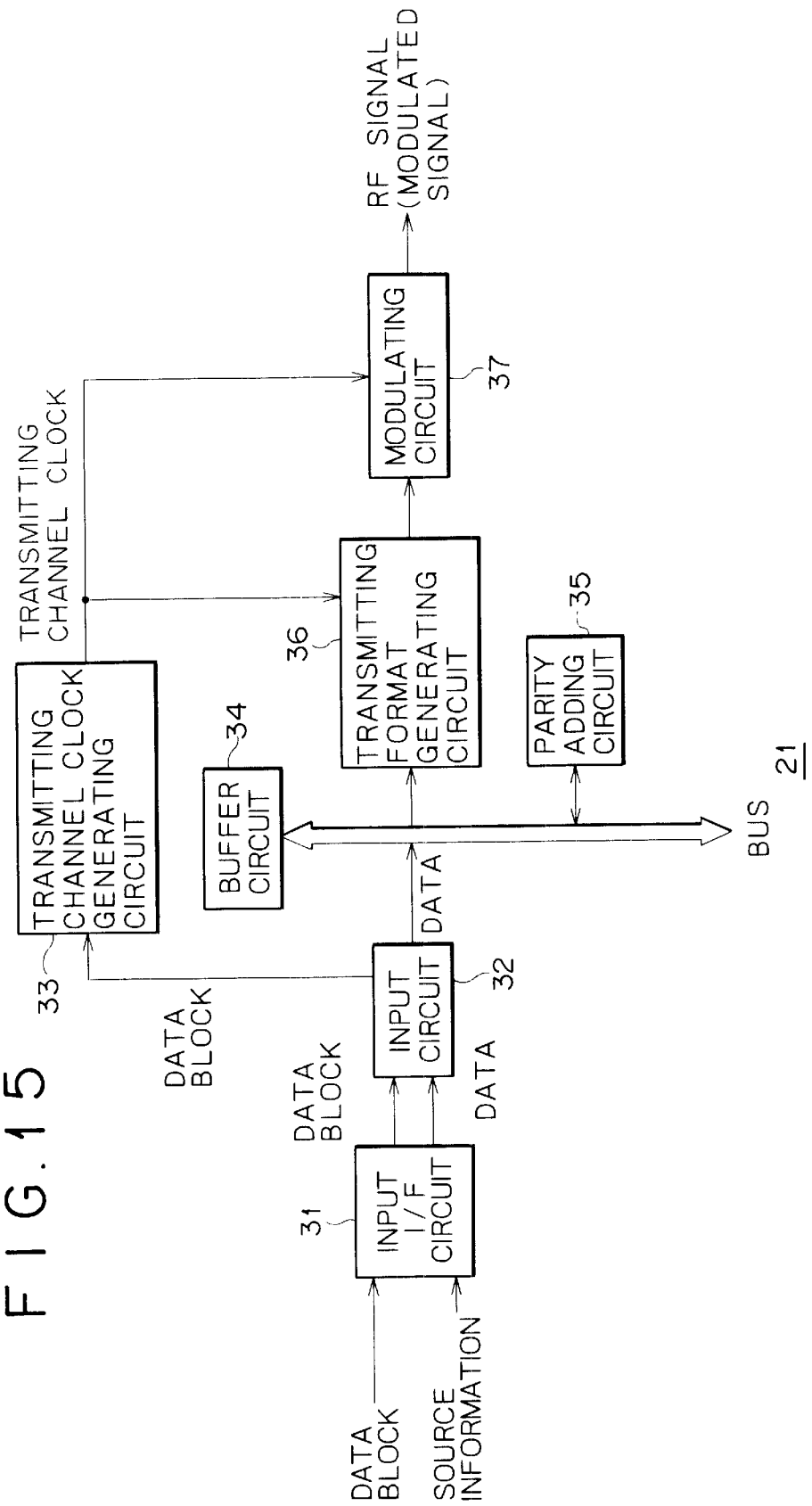
FIG. 15 is a diagram showing an example of structure of the transmitter 21.

FIG. 15 shows an example of structure of the transmitter 21 of FIG. 1. The data block signal from the multiplexer 14-3 and the source signal from the CPU16-1 are input to the input I/F circuit 31. The input I/F circuit 31 extracts the data clock from the data block signal and source information signal and then inputs this data clock to the input circuit 32. The input circuit 32 supplies the data clock to the transmitting channel clock generating circuit 33. The transmitting channel clock generating circuit 33 is formed, for example, of a PLL (Phase Lock Loop) circuit, a frequency dividing circuit and a frequency multiplying circuit, etc. to generate the transmitting channel clock of the frequency equal to 5/4 times the data clock from the input circuit 32. This transmitting channel clock is supplied to the transmitting format generating circuit 36 and modulating circuit 37 and thereby the transmitting format generating circuit 36 and modulating circuit 37 operate corresponding to the transmitting channel clock.

As a result, the modulating signal is output from the modulating circuit 37 in the timing of the transmitting channel clock. Namely, the modulating circuit is transmitted in the transmission rate corresponding to the frequency equal to 5/4 times the data clock of the data block signal and source information signal and a ratio of the transmission rate of the data transmitted to the receiving apparatus 2 from the transmitter 1 via the infrared ray emitter 22 and the data rate of the data clock and source information becomes 5/4. When it is assumed that the QPSK modulation, for example, is performed in the modulating circuit 37, namely when the digital phase modulation is performed to the symbol of the data in unit of two bits including the data block output from the transmitting format generating circuit 36, if frequency of the transmitting channel clock is equal to 5/4 times the data clock, such frequency is equal to 5/8 times (=5/4×1/2) of the symbol clock (symbol rate).

Figure 16:
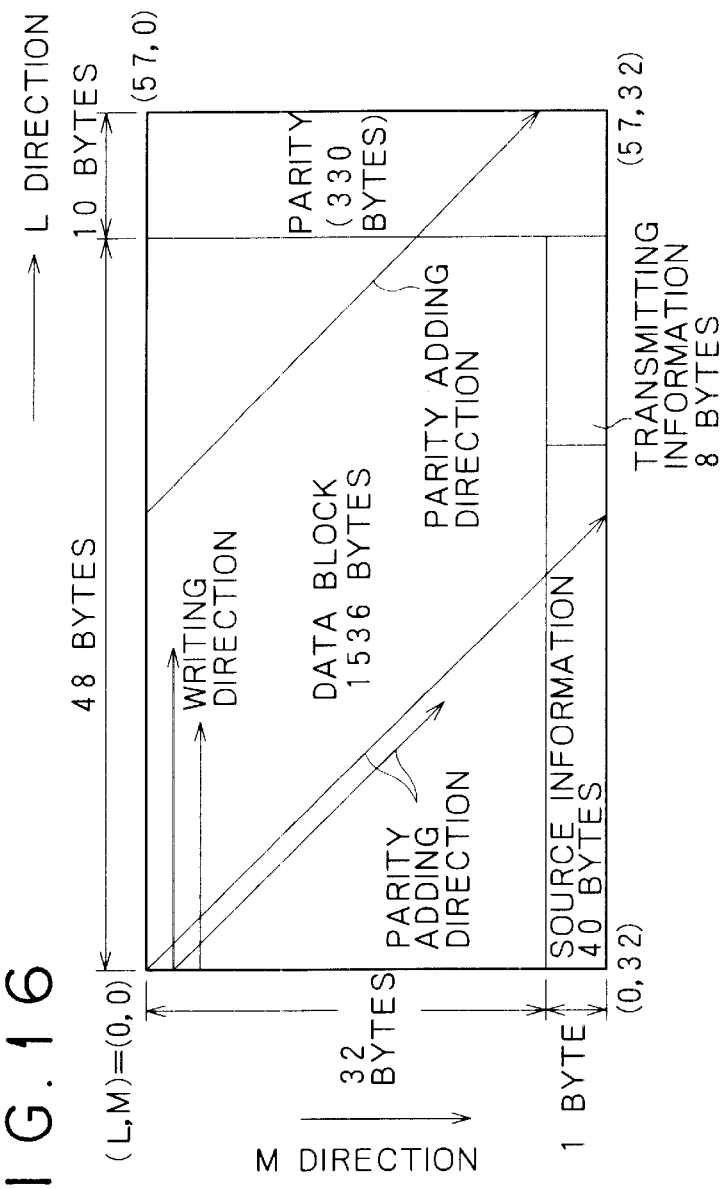
FIG. 16 is a diagram showing a format of data in a buffer circuit 34.

As explained above, the input I/F circuit 31 extracts the data clock from the input data block signal and source information signal and moreover converts such data block and source information to the predetermined format and then outputs such data to the input circuit 32. The input circuit 32 outputs, upon reception, from the input I/F circuit 31, of the data block and source information converted to the predetermined format, these signals to a buffer circuit 34 via a bus. The buffer circuit 34 stores, in unit of byte, the data block and source information from the input circuit 31. Namely, the buffer circuit 34 stores, after storing of the data block of 48 bytes, the data block in the L direction (from left to right) in unit of byte as shown in FIG. 16 and also stores, in the next lower stage, the data block in the L direction in unit of byte. When the data block of 48 bytes are stored in such stage, the data block is stored in unit of byte in the next lower stage and subsequently such process is repeated until the data block of 32 bytes is stored in the M direction (from upper to the lower direction).

Namely, when the an address (memory address) of the buffer circuit 34 is expressed by the coordinates (L, M) in the L and M directions and it is also assumed that the L or M coordinates respectively increase in the left direction or lower direction defining the most upper left address as (0, 0), the data block from the input circuit 32 is written into the buffer circuit 34 in the following sequence (writing sequence).

(0,0), (1,0), (2,0),...,(46,0), (47,0),
(0,1), (1,1), (2,1),...,(46,1), (47,1),
(0,2), (1,2), (2,2),...,(46.2), (47,2)
(0,31), (1,31), (2,31),...,(46,31), (47,31),

As explained above, the data block is stored in the buffer circuit 34.

Next, in the next lower stage of the buffer circuit 34, the source information is stored in unit of byte. Namely, the source information is sequentially stored from the address (0,31) to the address (39,32). Moreover, the input circuit 32 outputs the transmitting information consisting of eight bytes indicating the data block number. The buffer circuit 34 writes the input transmitting information to the addresses from (40,32) to (37,32).

When the data block of 48×33 bytes, source information and transmitting information are stored in the buffer circuit 34, a parity adding circuit 35 reads acoustic data via the bus from the buffer circuit 34 and generates an error correction code (parity) (ECC) to correct an error of the acoustic data. The parity adding circuit 35 adds the error correction code to the data block, source information and transmitting information and then stores again such signals in the buffer circuit 34 via the bus.

Namely, the parity adding circuit 35 reads, as shown in FIG. 16, the data block of 48 bytes, source information and transmitting information in the right lower direction (direction parallel to the straight line M=L) and calculates the error correction signal, for example, of 10 bytes corresponding to the data block, source information and transmitting information. The parity adding circuit 35 writes the data block of 48 bytes, source information and transmitting information to the original position of the buffer circuit 34 and subsequently writes the error correction code. In the subsequent processes, the similar processing is repeated for all data block, source information and transmitting information stored in the buffer circuit 34.

In more practical, for example, the data block, source information and transmitting information stored in the addresses (0,0),(1,1),(2,2), . . . ,(31,31),(32,31),(33,0), (34, 1), . . . ,(47,14) are read from the buffer circuit 34 and the error correction code of 10 bytes for such data block, source information and transmitting information is calculated. The data block, source information and transmitting information are stored in the same addresses as explained above and the error correction code is stored in the addresses (48,15),(49, 16),(50,17), . . . ,(56,23), (57,24) in the lower right direction of the address (47,14).

Next, the data block, source information and transmitting information stored in the addresses (0,1), (1,2),(2,3), . . . , (31,32),(32,0),(33,1),(34,2), . . . , (47,15),(48,16) are read from the buffer circuit 34 and the error correction data of 10 bytes for such data block, source information and transmitting information is calculated. The data block, source information and transmitting information are stored in the same address as explained above and the error correction code is stored in the addresses (49,17), (50,18),(51,19), . . . ,(56, 24),(57,25) in the right lower direction of the address (48,16).

Hereinafter, the same process is repeated until the error correction code for the data block, source information and transmitting information stored in the addresses (0,32), (1,0),(2,1), . . . ,(31,30),(32,31),(33,32),(34,0), . . . , (46,12), (47,12) is stored in the addresses (48,14),(49,15), (50,16), . . . ,(56,22),(57,23).

Therefore, the parity adding circuit 35 adds the error correction code of 330(=10×33) bytes to the data block of 1584(=48×33) bytes, source information and transmitting information in order to structure, in one unit, the data block of 1584 bytes, source information and transmitting information and error correction code of 330 bytes (data in the unit processed by the transmitting format generating circuit 15 is generated).

In this embodiment, for example, as the error correction code, the Reed-Solomon code defined on the Galois field $G(2^8)$ is used. Moreover, the code length of this Reed-Solomon code is set as (58, 48) and its code length d is defined as 11, etc. However, the code length of Reed-Solomon code is not limited to (58, 48) and may also be set to (38,32) or other.

When the error correction code is added as explained above to the data block, source information and transmitting information stored in the buffer circuit 34, the transmitting format generating circuit 36 reads the data stored in the buffer circuit 34 in unit of byte from the address (0,0) in the M direction (from upper to lower direction), for example, as shown in FIG. 16. Namely, the transmitting format generating circuit 36 read data from the buffer circuit 34 in the following sequence (readout sequence).

(0,0), (0,1), (0,2),....,(0,31), (0,32),
(1,0), (1,1), (1,2),....,(1,31), (1,32),
(2,0), (2,1), (2,2),....,(2,31), (2,32),
(57,0), (57,1), (57,2),....,(57,31), (57,32)

As explained above, the data block, source information and transmitting information to which the error correction code is added are interleaved when these are read in the reading sequence different from the write sequence to the buffer circuit 34. Therefore, an error correction capability to the burst error an be improved.

Figure 17:
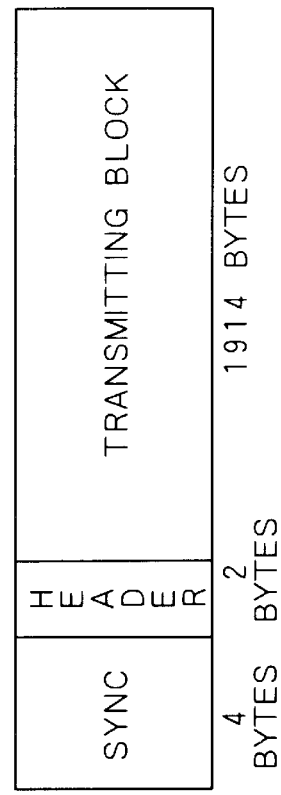
FIG. 17 is a diagram showing a transmission format output from the transmitter 21.

The transmitting format generating circuit 36 adds the sync data consisting of four bytes for synchronization in the receiving apparatus 2 as shown in FIG. 17 and header consisting of two bytes in which the necessary information is described for every data amount equal to the data amount of the data block, source information, transmitting information and error correction code stored in the buffer circuit 34, namely for every 1914 (48×33+10×33) bytes data (transmitting block in FIG. 17) and then converts the signal to the data for transmitting format (hereinafter referred to as the transmitting data, as required).

As the sync data, a pattern in which the DC element is not centralized is used. Namely, for example, in the case of conducting the QPSK modulation in the modulating circuit 16, "01111011111111111111111111111111" and "01111011011110110111101101111011" are used as the part sync and "11111111111111111111111111111111" and "01111011011110110111101111111111" are used as he chapter,sync. As the header, the information about the use of time slot in the data block is stored at a time.

The transmitting data output from the transmitting format generating circuit 36 is supplied to the modulating circuit 37 and is modulated by the phase shift modulation method such as, for example, QPSK modulation and TCM8PSK modulation. Here, it is also possible to conduct, for example, only the 8PSK modulation in place of the modulation combining the TCM modulation and 8PSK modulation, but an error rate increases because distance between information points to be determined becomes short in the 8PSK modulation in comparison with that when only the QPSK modulation is performed. Therefore, in the receiving side, the most likelihood decoding is conducted in view of preventing increase of error rate. Accordingly, it is preferable to conduct also the TCM modulation in addition to the 8PSK modulation.

Figure 18:
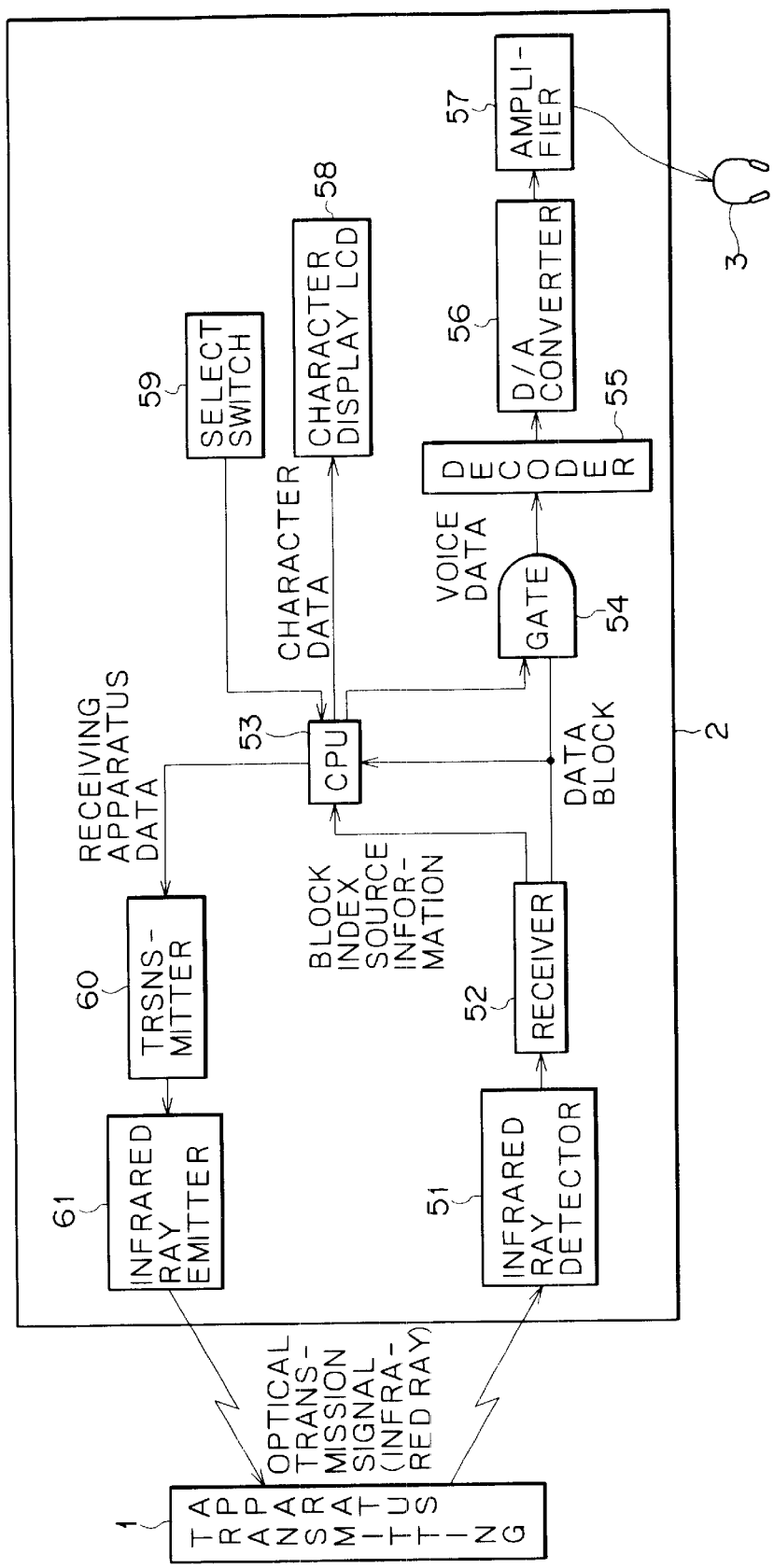
FIG. 18 is a block diagram showing a structure of an embodiment of the receiving apparatus.

FIG. 18 is a block diagram showing the structure of a preferred embodiment of the receiving apparatus 2 of the present invention. The modulated infrared ray output from the transmitting apparatus 1 and propagated through the space is input to the infrared ray detector 51. The infrared ray detector 51 is designed in the same manner as the infrared ray detector 24 of FIG. 1. The infrared ray detector 51 outputs the signal corresponding to the modulated infrared ray, namely the RF signal corresponding to the modulated signal output from the transmitting apparatus 1. The RF signal output from the infrared ray detector 51 is supplied to the receiver 52.

Figure 19:
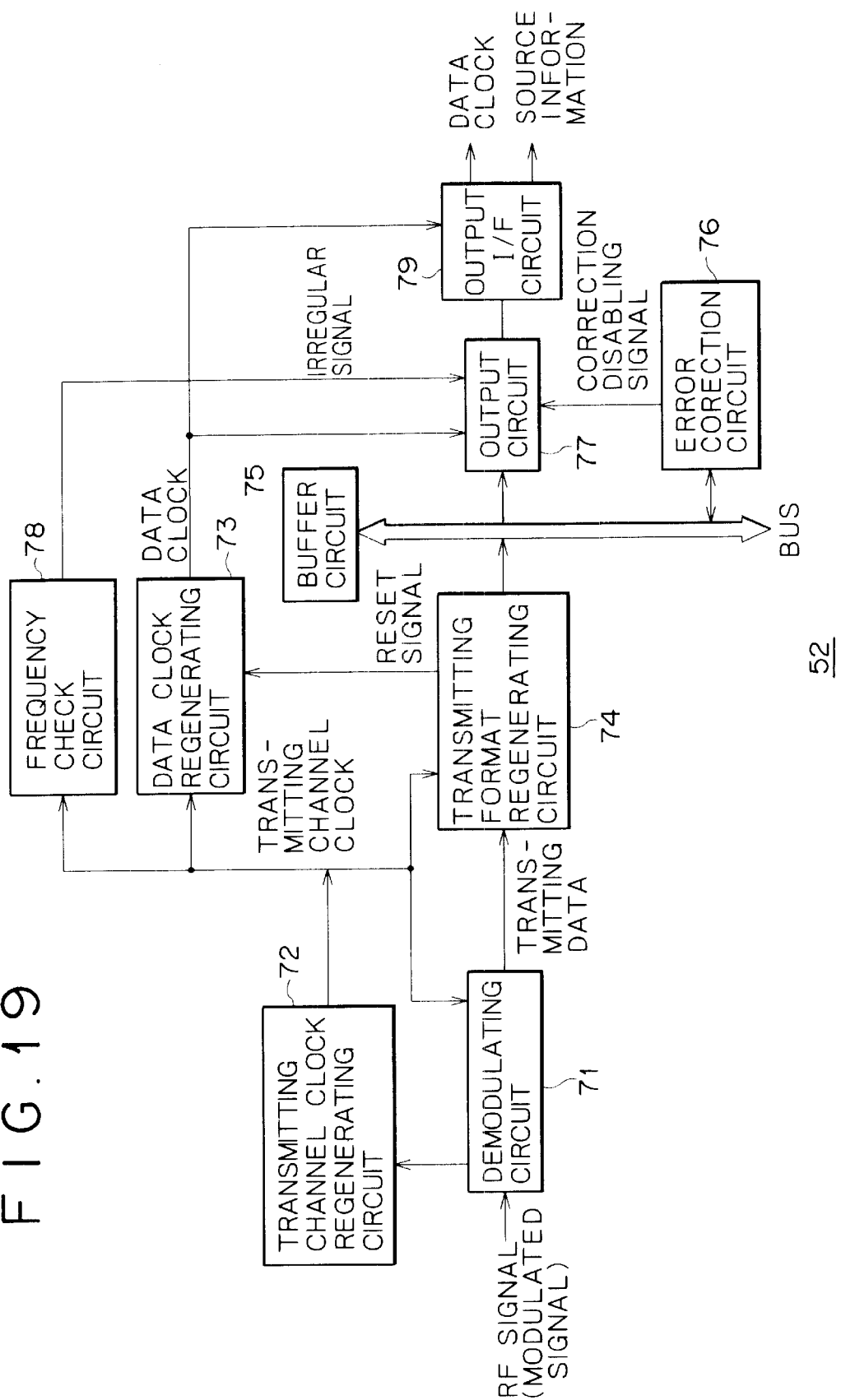
FIG. 19 is a diagram showing an example of structure of a receiver 52.

FIG. 19 shows an example of structure of the receiver 52 of FIG. 18. The modulated signal explained above is input to the demodulating circuit 51 of the receiver 52. The demodulating circuit 71 is formed by including a carrier extracting circuit having the so-called costas loop, the modulated signal is then phase-demodulated by the QPSK demodulation and TCM8PSK demodulation. Thereby, the transmitting data of the format explained in regard to FIG. 17 is reproduced. This transmitting data is then supplied to the transmitting channel clock reproducing circuit 72 and transmitting format reproducing circuit 74.

The transmitting channel clock reproducing circuit 72 reproduces the transmitting channel clock based on the transmitting data from the demodulating circuit 71 and then supplies this transmitting channel clock to the demodulating circuit 71, data clock reproducing circuit 73, transmitting format reproducing circuit 74 and frequency check circuit 78. Thereby, the process is performed depending on the transmitting channel clock in the demodulating circuit 71 and transmitting format reproducing circuit 74.

The data clock reproducing circuit 73 is formed, for example, of a PLL circuit, a frequency dividing circuit and a frequency multiplying circuit and reproduces, based on the transmitting channel clock from the transmitting channel clock reproducing circuit 72, the clock of which frequency is multiplied up to 4/5 times, namely the data clock of the data block and source information. This data clock is then supplied to the output circuit 77, output I/F circuit 59 and the other necessary blocks. Thereby, the process is conducted by the timing of data clock in the output circuit 77 and output I/F circuit 79.

To the data clock reproducing circuit 73, the reset signal is supplied from the transmitting format reproducing circuit 74 and in the data clock reproducing circuit 73, this reset signal controls the lock phase of the comprised PLL circuit.

On the other hand, the transmitting format reproducing circuit 74 extracts the transmitting block from the transmitting data from the demodulating circuit 71 and causes the buffer circuit 75 to store the transmitting block as in the case of the buffer circuit 34 of FIG. 15 via the bus. Namely, the transmitting format reproducing circuit 74 writes the data forming the transmitting block to the buffer circuit 75 in the M direction. Thereby, deinterleave is performed by re-structuring the data block of 58×33 bytes (hereinafter referred to as deinterleave block) consisting of the data block, source information and error correcting code explained in FIG. 16.

As explained above, the transmitting format reproducing circuit 74 writes the deinterleave block to the buffer circuit 75 and moreover detects sync in the transmitting data and outputs the reset signal to the data clock reproducing circuit 73 in the timing of such sync. Thereby, the lock phase of the data clock reproducing circuit 73 is controlled as explained above.

When the deinterleave block is stored in the buffer circuit 75, the error correcting circuit 76 reads the deinterleave block as in the case of the parity adding circuit 14 of FIG. 3 and performs error correction of the data block and source information on the basis of the error correction code. The error correction circuit 76 writes the error-corrected data block and source information to the buffer circuit 75.

Here, in this embodiment, the Reed-Solomon code is used as the error correction code as explained above and the error correction circuit 76 respectively sets the correction code distance d or error correction enabling range r for enabling the error correction to 11 or 4 to perform the error correction within this range.

Moreover, the error correction circuit 76 is caused, when error correction cannot be realized, to output the correction disabling signal indicating this condition to an output circuit 77. The output circuit 77 is caused, upon reception of correction disabling signal from the error correction circuit 76, to stop output of the data block and source information read from the buffer circuit 75. Thereby, it is possible to prevent output of the data block and source information of which error cannot be corrected.

When writing of the data block and source information to the buffer circuit 75 by the error correction circuit 76 is completed, the output circuit 77 reads the data block and source information from the buffer circuit 75 depending on the data clock from the data clock reproducing circuit 73 and then outputs these signals to the output I/F circuit 79. The output I/F circuit 79 also performs the processes inverted from those in the input I/F circuit 31 in FIG. 15 to the data block and source information from the output circuit 77 depending on the data clock and then outputs the signals.

Here, an irregular signal is supplied to the output circuit 77 from a frequency check circuit 78 and the output circuit 77 is caused to stop output of the data block and source information when the irregular signal is received in addition to the case where the correction disabling signal is received.

The frequency check circuit 78 determines whether frequency of the transmitting channel clock supplied from the transmitting channel clock reproducing circuit 72 is normal or not, namely whether the frequency is, for example, 3.84 MHz (=48 kHz×32 bits×2×5/4) which is suitable for the standards IEC-958 in this embodiment or not. If the frequency of transmitting channel clock is not normal, an irregular signal indicating this condition is output. Thereby, output of the data block and source information by the output circuit 77 is stopped. Accordingly, in this case, output of irregular data block and source information can also be prevented.

Returning to FIG. 18, the block index signal and source information signal output from the receiver 52 are supplied to the CPU53. The data block signal output from the receiver 52 is supplied to the CPU53 and gate 54. The CPU53 supplies, to the gate 54, the signal instructing the gate 54 to output the voice data in such a timing that the predetermined voice channel data and the data of the predetermined NOD block are supplied to the gate 54 on the basis of the block index signal, source information and data block.

The voice data output from the gate 54 is supplied to a decoder 55. The decoder 55 converts the voice data supplied from the gate 54 to the format to be converted to voice by a D/A converter 56 and supplies the converted voice data to the D/A converter 56. The D/A converter 56 supplies the voice signal converted to analog signal to an amplifier 57 and the amplifier 57 amplifies the voice signal to the predetermined signal level suitable for hearing of it with an earphone 3.

The character data output from the CPU53 is supplied to the character display LCD (Liquid Crystal Display) 58 for displaying the characters corresponding to character data.

A select switch 59 supplies a signal designating the voice channel or NOD channel to the CPU53. The CPU53 supplies, to the transmitter 60, the receiving apparatus data including voice channel, NOD channel or information indicating the condition of the receiving apparatus 2.

Figure 20:
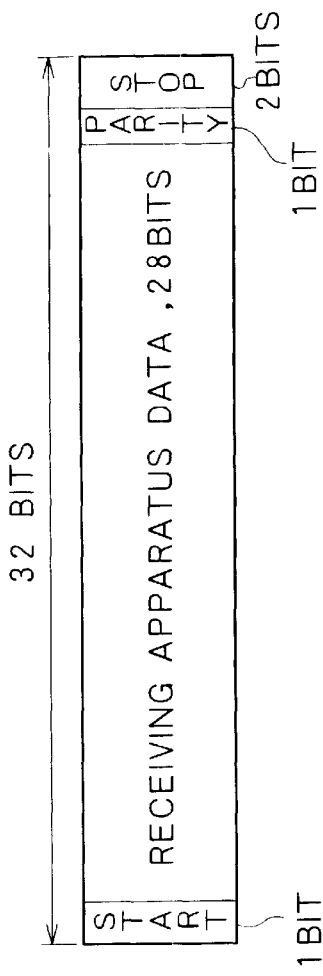
FIG. 20 is a diagram showing a transmission format output from a transmitter 60.

The transmitter 60 adds the necessary synchronous signal to the input receiving apparatus data and modulates the signal by the ASK (Amplitude Shift Keying) modulation method using 455 kHz frequency as the sub-carrier and then supplies the signal to the infrared ray emitter 61. FIG. 20 shows a transmitting format output from the transmitter 60. The transmitting format is formed of 32 bits in total by adding one bit of start bit before the receiving apparatus data of 28 bits indicating the voice channel, NOD channel or condition of the receiving apparatus 2 and also by adding one bit of parity bit and two bits of stop bit after the data of 28 bits.

Figure 21:
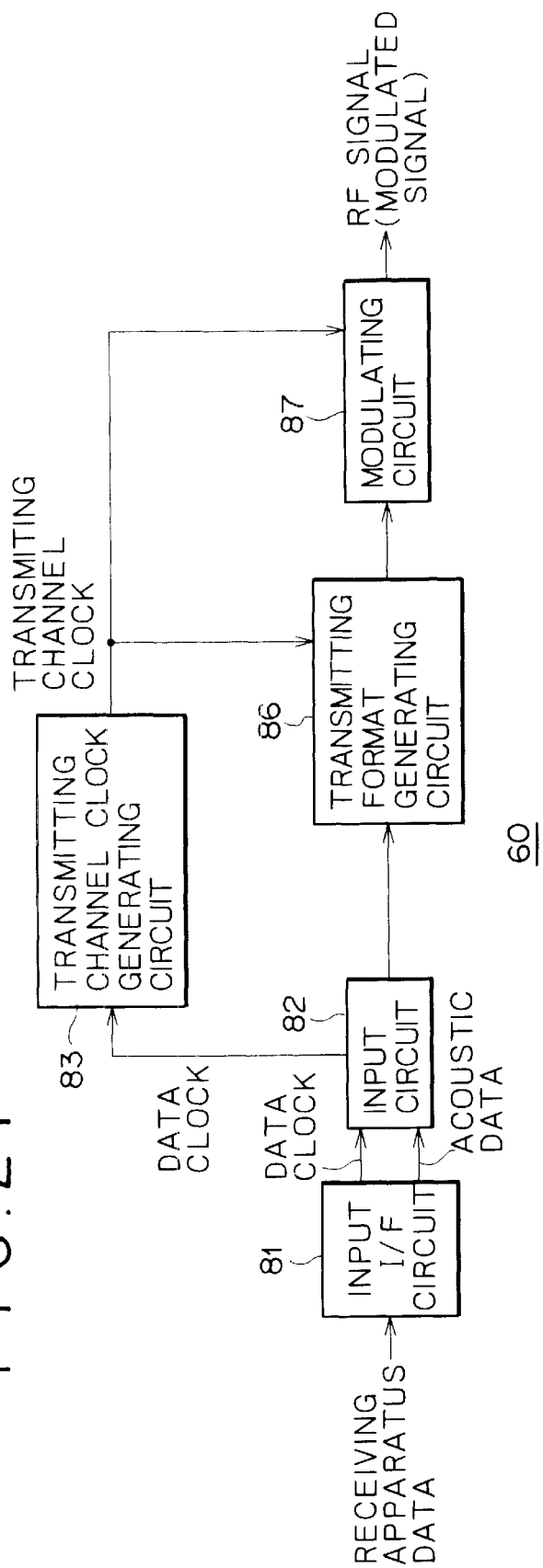
FIG. 21 is a diagram showing an example of structure of a transmitter 60.

FIG. 21 shows an example of the structure of the transmitter 60. The input I/F circuit 81 and input circuit 82 are same as those in FIG. 15. The transmitting format generating circuit 86 adds, to the input data, the start bit, parity and stop bits. The transmitting channel clock generating circuit 83 generates the transmitting channel clock and supplies this clock to the transmitting format generating circuit 86 and modulating circuit 87. The modulating circuit 87 modulates the data shaped to the transmitting format by the ASK modulation method using 455 kHz as the sub-carrier and then outputs the modulated signal.

Returning to FIG. 18, the modulated signal output from the transmitter 60 is supplied to the infrared ray emitter 61. The infrared ray emitter 61 is formed in the same structure as the infrared ray emitter 22 of FIG. 1.

Figure 22:
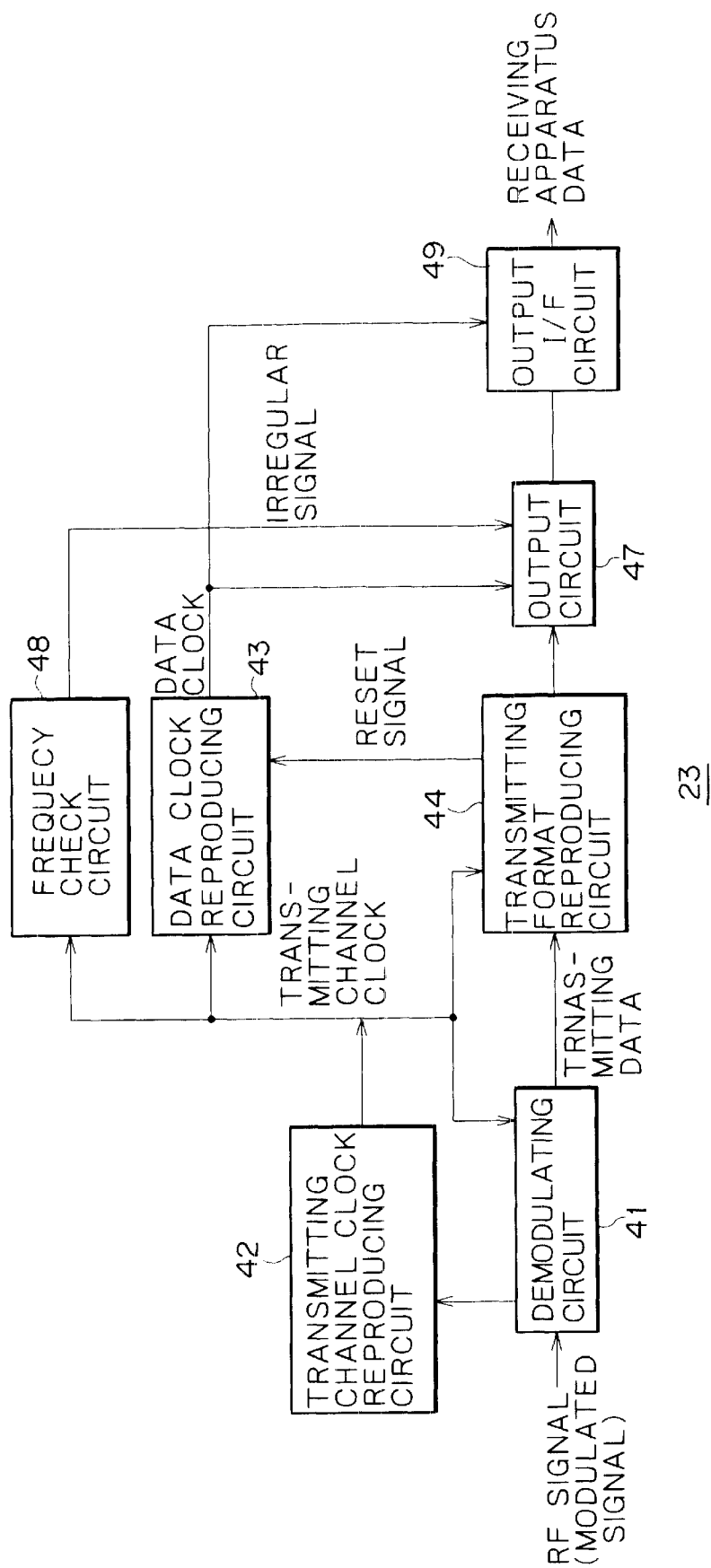
FIG. 22 is a diagram showing an example of structure of a receiver 23.

FIG. 22 shows an example of the structure of the receiver 23 shown in FIG. 1. The transmitting channel clock regenerating circuit 43, frequency check circuit 48, output circuit 47 and output I/F circuit 49 are formed in the same structure as those in FIG. 19. The demodulating circuit 41 demodulates the ASK-modulated signal and supplies the transmitting data of the transmitting format to the transmitting format regenerating circuit 44. The transmitting format regenerating circuit 44 extracts the voice channel of 28 bits, NOD channel or the receiving apparatus data indicating the condition of the receiving apparatus 2 and then supplies these signals to the output circuit 47.

Figure 23:
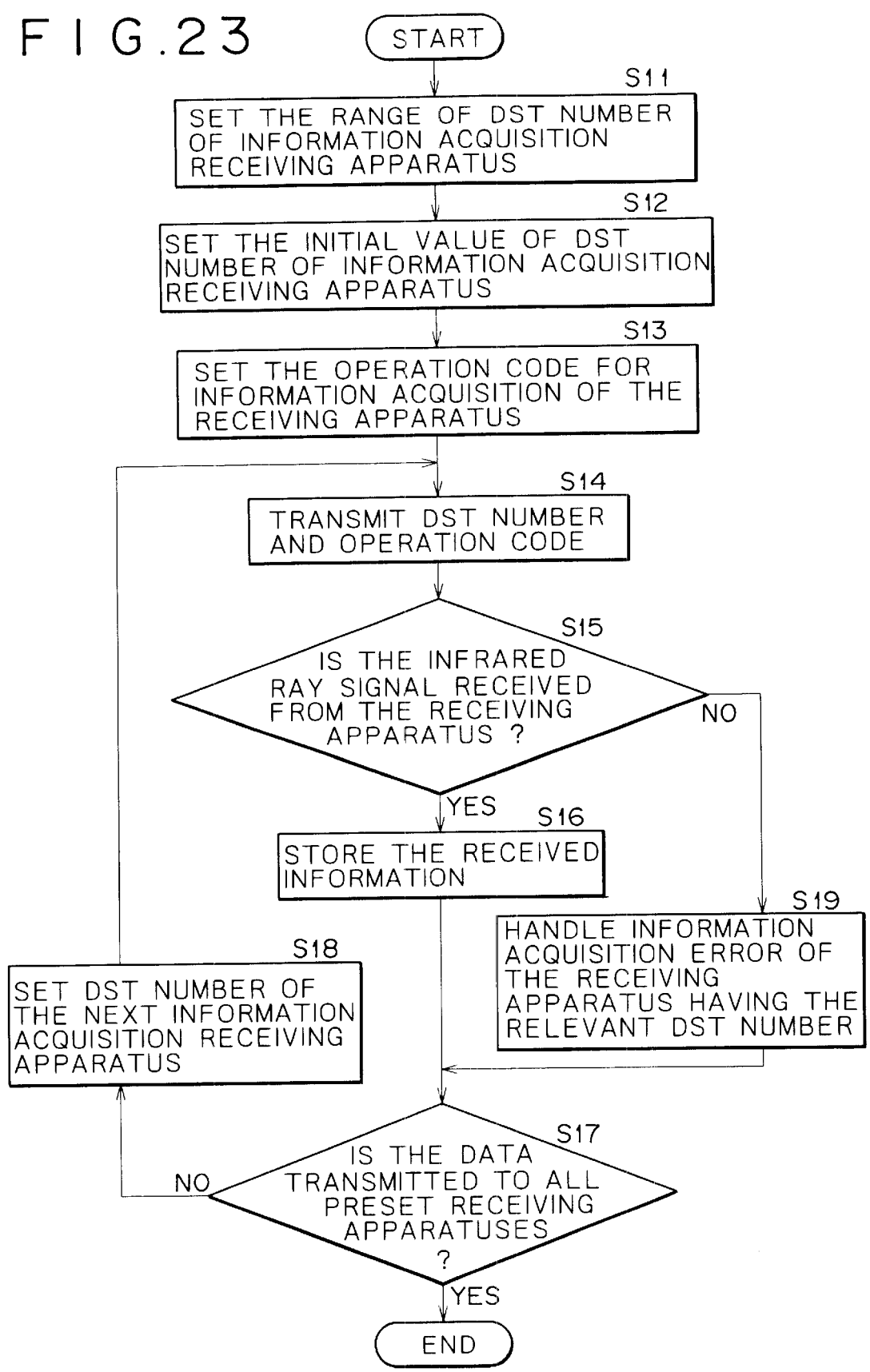
FIG. 23 is a flowchart showing operations to obtain, by the transmitting apparatus 1, the information to show the condition of the receiving apparatus 2.

FIG. 23 is a flowchart showing the operation that the transmitting apparatus 1 obtains the information indicating the condition of the receiving apparatus 2. In the step S11, the CPU16-1 sets the range of DST number of the receiving apparatus 2 to obtain the information and then transmits such value to the CPU16-3. In the step S12, the CPU16-3 sets the initial value of DST number of the receiving apparatus 2 to obtain information. In the step S13, the CPU16-1 sets, to the CPU16-3, the operation code to obtain the information of receiving apparatus 2 as the receiving apparatus data. In the step S14, the CPU16-3 inserts, to the predetermined time slot, the receiving apparatus data including the DST number and predetermined operation code and transmits the time slot to the transmitter 21 via the multiplexer 14-3.

In the step S15, it is determined whether the infrared ray signal is received from the predetermined receiving apparatus 2 designated by the DST number or not. When the infrared ray signal is determined to be received from the predetermined receiving apparatus 2 designated by the DST number, the procedure skips to the step S16. In the step S16, the CPU16-1 stores the information received from the predetermined receiving apparatus 2 to the predetermined position. In the step S15, when the infrared ray is determined not to be received from the predetermined receiving apparatus 2 designated by the DST number, the process for erroneous acquisition of information of the receiving apparatus of the relevant DST number is executed in the step S19 and the procedure skips to the step S17.

In the step S17, it is determined whether the DST number and operation code are transmitted or not to all preset receiving apparatuses. When it is determined that the DST number and operation code are not transmitted to all receiving apparatuses, the procedure goes to the step S18. In the step S18, the CPU16-1 sets the DST number of the receiving apparatus 2 to obtain the next information to the CPU16-3 and the procedure skips to the step S14. When it is determined that the DST number and operation code are transmitted to all receiving apparatuses in the step S17, the process is completed.

Figure 24:
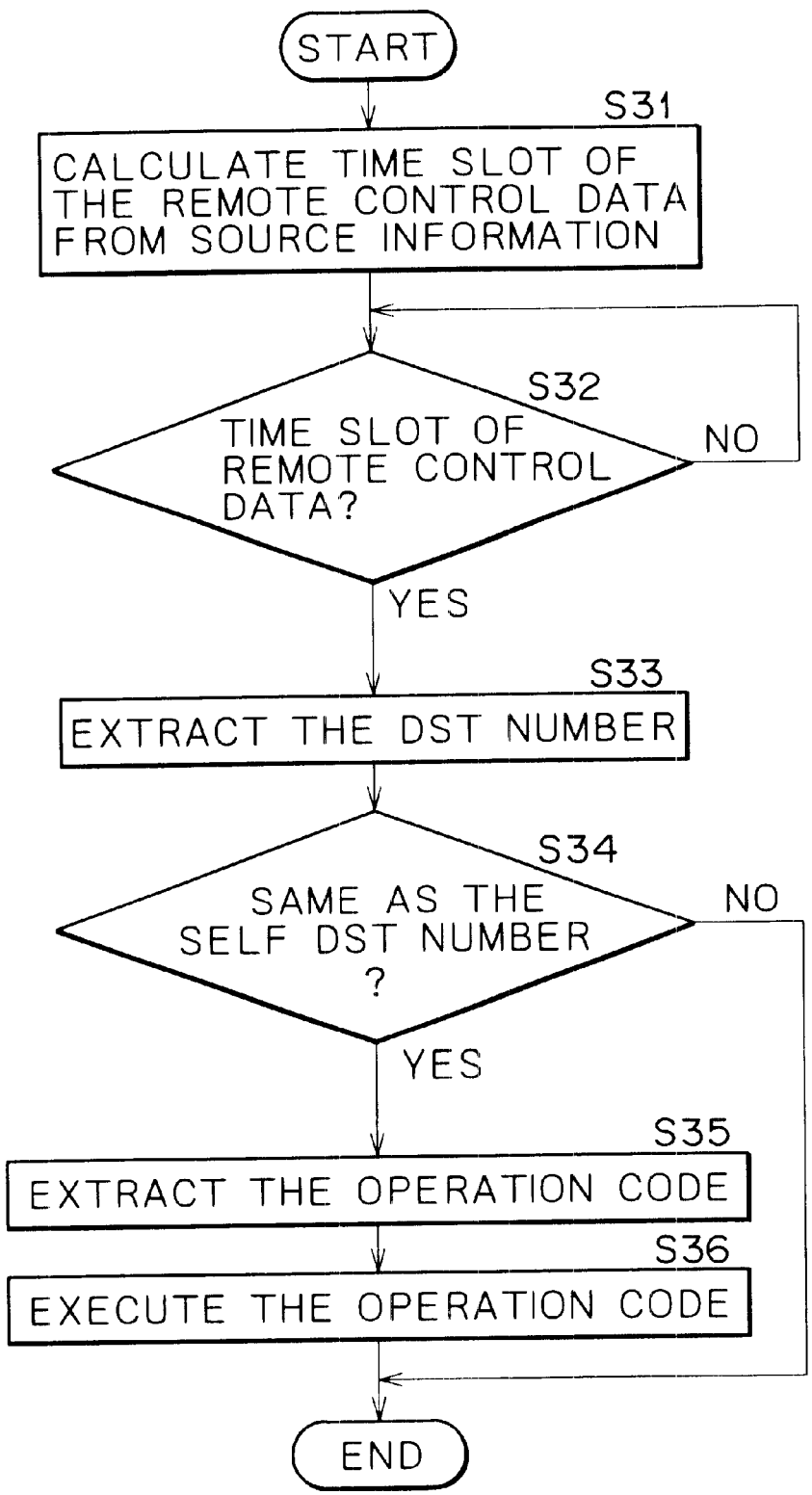
FIG. 24 is a flowchart showing operation to execute, by the receiving apparatus 2, the operation code of remote control data transmitted from the transmitting apparatus 1.

FIG. 24 is a flowchart indicating the operations in the case that the receiving apparatus 2 executes the operation code of the remote control data transmitted from the transmitting apparatus 1. In the step S31, the CPU53 calculates the time slot of the remote control data from the source information. In the step S32, it is determined whether the calculated time slot of the remote control data is the predetermined one or not. When it is not the predetermined time slot, the process is repeated until the predetermined time slot is obtained by returning to the step S32. When it is the predetermined time slot, the CPU53 extracts the DST number from the remote control data in the step S33. In the step S34, it is determined whether the DST number is same as the self DST number or not. When the extracted DST number is matched with the self DST number, the procedure skips to the step S35. In the step S35, the CPU53 extracts the operation code from the remote control data. In the step S36, the CPU53 executes the operation code extracted in the step S35. When the extracted DST number is determined not matched with the self DST number after the operation in the step S36 or in the step S34, the process is completed.

FIG. 25 shows a time chart of the signal in such a case that one receiving apparatus 2 is designated for data block and the operation code to transmit the receiving apparatus status is transmitted. In the remote control data of the first data block, 1 is designated as the DST number and the operation code for transmitting the receiving apparatus status is inserted to the operation code. For example, the receiving apparatus 2-1 of the DST number 1 having received this data block transmits the information indicating the status thereof to the transmitting apparatus 1. In the same manner, 2 is designated as the DST number in the remote control data of the next data block and the operation code of the receiving apparatus status transmission is inserted to the operation code. The receiving apparatus 2-2, for example, of the DST number 2 having received this data block transmits the information indicating the status thereof to the transmitting apparatus 1. As explained above, the transmitting apparatus 1 can obtain the information regarding respective status of a plurality receiving apparatuses by designating one receiving apparatus 2 for each data block and then transmitting the operation code of the status information transmission of the receiving apparatus.

As explained above, the transmitting apparatus 1 can collect various pieces of information of the receiving apparatuses 2-1 to 2-k. For instance, when the operation code instructing the operation is transmitted to many receiving apparatuses 2, it can be confirmed that respective receiving apparatuses 2 have executed the operation. Here, the transmitting apparatus 1 is also capable of simultaneously transmitting the receiving apparatus data to a plurality of receiving apparatuses 2 when it is not required to receive the information from the receiving apparatus 2.

In above embodiment of the present invention, only the voice signal is transmitted but the video signal or other signals may also be transmitted.

In this specification, a system represents the apparatus as a whole consisting of a plurality of apparatuses.

As a distribution medium for serving a computer program to execute the processes explained above to users, a communication media such as network and satellite can also be used in addition to a recording medium such as magnetic disc, CD-ROM and solid state memory, etc.

According to the transmitting apparatus and method, receiving apparatus and method, distribution medium and transmitting system of the present invention, not only a user can obtain the information supplied through a plurality of channels by selecting the channel without restriction of wiring but also a user can transmit the signal, requested by user or suitable for user, supplied through many channels.

What is claimed is:

1. A transmitting apparatus for an optically connected system having a plurality of receiving apparatus, comprising:

receiving means for detecting input infrared signals from said plurality of receiving apparatus;

plural encoders for digitizing and encoding a plurality of input analog voice signals;

plural on-demand servers corresponding to said plural encoders for accumulating encoded voice signals as on-demand voice data and on-demand control information from the detected input infrared signals;

a near on-demand server for supplying previously stored near on-demand voice data and near on-demand control information;

character data supplying means for supplying character data;

control data supplying means for supplying remote control data;

multiplexing means for selecting and multiplexing said plurality of input analog voice signals, said on-demand voice data and on-demand control information, said near on-demand voice data and near on-demand control information into a plurality of voice data channels; the voice data channels being multiplexed with said character data and said remote control data into data blocks; and transmitting means for transmitting said data blocks as output infrared signals to said plurality of receiving apparatus.

2. The transmitting apparatus according to claim 1, wherein said transmitting means includes a parity adding circuit for providing a parity check to each of the transmitted data blocks.

3. The transmitting apparatus according to claim 1, wherein said data blocks include destination numbers for identifying each of said plurality of receiving apparatus intended to receive the transmitted data blocks.

4. The transmitting apparatus according to claim 1, wherein said character data comprises accumulation mode character data and real-time display mode character data.

5. The transmitting apparatus according to claim 1, wherein said optically connected system is a language learning system.

6. An optically connected system, comprising:

a plurality of receiving apparatus for transmitting input infrared signals to a transmitting apparatus and for receiving data blocks transmitted from said transmitting apparatus; and said transmitting apparatus, comprising:

receiving means for detecting the input infrared signals transmitted from said plurality of receiving apparatus;

plural encoders for digitizing and encoding a plurality of input analog voice signals;

plural on-demand servers corresponding to said plural encoders for accumulating encoded voice signals as on-demand voice data and on-demand control information from the detected input infrared signals;

a near on-demand server for supplying previously stored near on-demand voice data and near on-demand control information;

character data supplying means for supplying character data;

control data supplying means for supplying remote control data;

multiplexing means for selecting and multiplexing said plurality of input analog voice signals, said on-demand voice data and on-demand control information, said near on-demand voice data and near on-demand control information into a plurality of voice data channels; the voice data channels being multiplexed with said character data and said remote control data into data blocks; and transmitting means for transmitting said data blocks as output infrared signals to said plurality of receiving apparatus.

7. The transmitting apparatus according to claim 1, wherein said transmitting means includes a parity adding circuit for providing a parity check to each of the transmitted data blocks.

8. The optically connected system according to claim 6, wherein each of said plurality of receiving apparatus includes an error correction circuit for detecting errors in the received data blocks.

9. The optically connected system according to claim 6, wherein each of said plurality of receiving apparatus includes a character display for displaying the character data in the received data blocks.

10. The optically connected system according to claim 6, wherein said data blocks include destination numbers for identifying each of said plurality of receiving apparatus intended to receive the transmitted data blocks.

11. The optically connected system according to claim 6, wherein each of said plurality of receiving apparatus includes a selecting means for selecting data blocks intended for a particular receiving apparatus on the basis of destination numbers included in said data blocks.

12. The optically connected system according to claim 6, wherein said character data comprises accumulation mode character data and real-time display mode character data.

13. The optically connected system according to claim 6, wherein the system is a language learning system.

* * * * *